United States Patent
Chen et al.

(10) Patent No.: US 9,844,072 B2
(45) Date of Patent: Dec. 12, 2017

(54) ULTRA-LOW LATENCY LTE UPLINK FRAME STRUCTURE

(71) Applicant: QUALCOMM Incorporated, San Diego, CA (US)

(72) Inventors: Wanshi Chen, San Diego, CA (US); Peter Gaal, San Diego, CA (US); Shimman Arvind Patel, San Diego, CA (US); Durga Prasad Malladi, San Diego, CA (US); Aleksandar Damnjanovic, Del Mar, CA (US); Hao Xu, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 14/839,678

(22) Filed: Aug. 28, 2015

(65) Prior Publication Data

US 2016/0095137 A1 Mar. 31, 2016

Related U.S. Application Data

(60) Provisional application No. 62/056,281, filed on Sep. 26, 2014, provisional application No. 62/056,397, (Continued)

(51) Int. Cl.
*H04L 12/26* (2006.01)
*H04W 72/14* (2009.01)
(Continued)

(52) U.S. Cl.
CPC ........... *H04W 72/14* (2013.01); *H04L 1/0031* (2013.01); *H04L 1/1671* (2013.01);
(Continued)

(58) Field of Classification Search
CPC .. H04L 5/003; H04W 72/0413; H04W 72/10; H04W 72/14
See application file for complete search history.

(56) References Cited

U.S. PATENT DOCUMENTS

2009/0207797 A1 8/2009 Shen et al.
2009/0310707 A1 12/2009 Cheng et al.
(Continued)

FOREIGN PATENT DOCUMENTS

WO WO-2016/204811 A1 12/2016
WO WO-2017/054876 A1 4/2017

OTHER PUBLICATIONS

Alcatel-Lucent et al., "Remaining Issues for SRS for CoMP," 3GPP Draft; R1-123144, 3rd Generation Partnership Project (3GPP), Mobile Competence Centre ; 650, Route Des Lucioles ; F-06921 Sophia-Antipolis Cedex ; France vol. RAN WG1, no. Qingdao, China; Aug. 13, 2012-Aug. 17, 2012 Aug. 5, 2012 (Aug. 5, 2012), XP050661036, Retrieved from the Internet: URL:http://www.3gpp.org/ftp/tsg_ran/WG1_RL1/TSGR1 70/Docs/ [retrieved on Aug. 5, 2012], 5 pages.
(Continued)

*Primary Examiner* — Kevin C Harper
(74) *Attorney, Agent, or Firm* — Arent Fox LLP

(57) ABSTRACT

Various aspects described herein relate to communicating in a wireless network. An uplink resource grant can be received from a network entity for communicating in the wireless network. A transmission time interval (TTI) for an uplink transmission within a subframe based on the uplink resource grant can be determined, wherein the TTI comprises one or more symbols which are a subset of a plurality of symbols in the subframe. Communications can be transmitted to the network entity over resources specified in the uplink resource grant during the TTI.

68 Claims, 18 Drawing Sheets

Related U.S. Application Data filed on Sep. 26, 2014, provisional application No. 62/056,403, filed on Sep. 26, 2014.

(51) Int. Cl.

| | |
|---|---|
| *H04L 1/18* | (2006.01) |
| *H04L 5/00* | (2006.01) |
| *H04L 27/26* | (2006.01) |
| *H04W 72/04* | (2009.01) |
| *H04L 1/16* | (2006.01) |
| *H04L 25/02* | (2006.01) |
| *H04L 1/00* | (2006.01) |
| *H04W 88/02* | (2009.01) |

(52) U.S. Cl.
CPC .......... *H04L 1/1812* (2013.01); *H04L 1/1887* (2013.01); *H04L 5/0007* (2013.01); *H04L 5/0048* (2013.01); *H04L 5/0078* (2013.01); *H04L 5/0092* (2013.01); *H04L 5/0096* (2013.01); *H04L 25/0224* (2013.01); *H04L 27/2601* (2013.01); *H04W 72/0413* (2013.01); *H04L 1/0003* (2013.01); *H04L 1/0088* (2013.01); *H04L 1/1685* (2013.01); *H04L 1/1861* (2013.01); *H04W 88/02* (2013.01)

(56) References Cited

U.S. PATENT DOCUMENTS

| | | | |
|---|---|---|---|
| 2011/0039568 A1* | 2/2011 | Zhang | H04W 52/50 455/452.1 |
| 2011/0122933 A1* | 5/2011 | Adam | H04B 7/15592 375/219 |
| 2011/0141941 A1 | 6/2011 | Lee et al. | |
| 2012/0008589 A1* | 1/2012 | Iwai | H04B 1/713 370/329 |
| 2013/0044720 A1* | 2/2013 | Nakao | H04L 5/001 370/329 |
| 2013/0077660 A1 | 3/2013 | Ko et al. | |
| 2013/0090146 A1* | 4/2013 | Kwon | H04W 52/365 455/509 |
| 2013/0195031 A1* | 8/2013 | Hessler | H04L 1/1819 370/329 |
| 2014/0086189 A1 | 3/2014 | Takeda et al. | |
| 2014/0269452 A1 | 9/2014 | Papasakellariou | |
| 2014/0286255 A1 | 9/2014 | Nam et al. | |
| 2014/0301338 A1 | 10/2014 | Zhong et al. | |
| 2015/0256312 A1 | 9/2015 | Yi et al. | |
| 2015/0351058 A1 | 12/2015 | Seo | |
| 2016/0020891 A1* | 1/2016 | Jung | H04W 72/0446 370/280 |
| 2016/0095104 A1 | 3/2016 | Chen et al. | |
| 2016/0095105 A1 | 3/2016 | Chen et al. | |
| 2016/0182202 A1 | 6/2016 | Patel et al. | |
| 2016/0192385 A1 | 6/2016 | Tooher et al. | |
| 2017/0041103 A1 | 2/2017 | Määttanen et al. | |

OTHER PUBLICATIONS

Ericsson et al., "TBS Determination for Additional Special Subframe Configuration," 3GPP Draft; R1-122008, 3rd Generation Partnership Project (3GPP), Mobile Competence Centre ; 650, Route Des Lucioles ; F-06921 Sophia-Antipolis Cedex ; France, vol. RAN WG1, no. Prague, Czech Republic; May 21, 2012-May 25-2012, May 12, 2012 (May 12, 2012), XP050600300, 3 pages.
International Search Report and Written Opinion—PCT/US2015/047743—ISA/EPO—28 pages.
Nokia Siemens Networks et al., "PDCCH UL Grant Size of LTE TDD," 3GPP Draft; R1-082058 PDCCH UL Grant Size, 3rd Generation Partnership Project (3GPP), Mobile Competence Centre ; 650, Route Des Lucioles ; F-06921 Sophia-Antipolis Cedex ; France, vol. RAN WG1, no. Kansas City, USA; May 14, 2008, May 14, 2008 (May 14, 2008), XP050110395, 4 pages.
Panasonic: "System Performance of Uplink Non-contiguous Resource Allocation," 3GPP Draft; R1-090257, 3rd Generation Partnership Project (3GPP), Mobile Competence Centre ; 650, Route Des Lucioles ; F-06921 Sophia-Antipolis Cedex ; France, no. Ljubljana; Jan. 8, 2009, Jan. 8, 2009 (Jan. 8, 2009), XP050318184, 7 pages.
Eeva L., et al., "Achieving Low Latency and Energy Consumption by 5G TDD Mode Optimization," 2014 IEEE International Conference on Communications Workshops (ICC), IEEE, Jun. 10, 2014 (Jun. 10, 2014), pp. 1-6, XP032630839, DOI: 10.1109/ICCW.2014.6881163 [retrieved on Aug. 20, 2014] figures 2-5 section II, scheduling latency in a tdd system section IV, limits due to the ofdm frame length.
Gerhard W., et al., "5GNOW: Non-Orthogonal, Asynchronous Waveforms for Future Mobile Applications", IEEE Communications Magazine, IEEE Service Center, Piscataway, US, vol. 52, No. 2, Feb. 12, 2014 (Feb. 12, 2014), pp. 97-105, XP011539680, ISSN: 0163-6804, DOI: 10.1109/MCOM.2014.6736749 [retrieved on Feb. 10, 2014] p. 99-p. 100; figure 2.
Partial International Search Report—PCT/US2015/047743—ISA/EPO—Feb. 12, 2015. (11 pages).
"Study on Latency reduction techniques for 1,3,20, LTE," 22,39, 3GPP Draft; RP-141375 Study on Latency 41,47, Reduction Techniques,—3rd Generation 49,55, Partnership Project (3GPP), Mobile 57,69, Competence Centre ; 650, Route Des 71,77, Lucioles ; F-06921 Sophia-Antipolis Cedex 79,85,87; France 9 Sep. 2, 2014 (Sep. 2, 2014), XP050783718, Retrieved from the Internet: URL:http://www.3gpp.org/ftp/Meetings_3GPP_SYNC/RAN/Docs/ [retrieved on Sep. 2, 2014]. (8 pages).
Asustek: "Consideration on Simultaneous Transmission of Sri and Harqack in Case of Channel Selection", 3GPP Draft; R1-105298 Consideration on Simultaneous Transmission of Sri and HARQ-ACK in Case of Channel Selection, 3rd Generation Partnership Project (3GPP), Mobile Competence Centre; 650, Route Des Lucioles ; F-06921 Sophia-Antipolis Cedex ; France, vol. RAN WG1, no. Xi 'an; Oct. 11, 2010. Oct. 5, 2010 (Oct. 5, 2010), XP050450465.
Ericsson, et al., "On the details of dynamic aperiodic SRS", 3GPP Draft; R1-104853, 3rd Generation Partnership Project (3GPP), Moblie Competence Centre; 650, Route Des Lucioles; F-06921 Sophia-Antipolis Cedex; France vol. RAN WG1, no. Madrid, Spain; Aug. 23, 2010, Aug. 17, 2010 (Aug. 17, 2010), pp. 1-6, XP050450027, [retrieved on Aug. 17, 2010].
I C-L, "Defining the Wireless Future—Vision 2020: Perspectives of Mobile Operators (5G: Data Rate and More)," Keynote ICC2014, Jun. 13, 2014 (Jun. 13, 2014), pp. 1-33, XP055227730, Retrieved from the Internet: URL:http://icc2014.ieee-icc.org/speakers_28_2327600902.pdf.
Qualcomm Incorporated., "Overhead Reduction", 3GPP Draft, 3GPP TSG RAN WG1 #72, R1-130594, Jan. 28, 2013-Feb. 1, 2013, Jan. 19, 2013 (Jan. 19, 2013), XP050663850, Retrieved from the Internet: URL: http://www.3gpp.org/ftp/tsg_ran/WG1_RL1/TSGR1_72/Docs/, 4 Pages.
Samsung: "Cyclic Shift and Orthogonal Cover Allocations for UL ACK/NACK", 3GPP Draft; R1-074784 ULACKNACK CS OC Allocations Final, 3rd Generation Partnership-Project (3GPP), Mobile Competence Centre; 650, Route Des Lucioles ; F-06921 Sophia-Antipolis Cedex ; France, vol. RAN WG1, no. Korea; Oct. 30, 2007, Oct. 30, 2007 (Oct. 30, 2007), XP050108252.
Texas Instruments: "Resource Allocation for Scheduling Request Indicator on PUCCH", 3GPP Draft; R1-080198 SR2, 3rd Generation Partnership Project (3GPP), Mobile Competence Centre; 650, Route Des Lucioles ; F-06921 Sophia-Antipolis Cedex; France, vol. RAN WG1, no. Sevilla, Spain; Jan. 9, 2008, Jan. 9, 2008 (Jan. 9, 2008), XP050108725.
TSG RAN WG1., "LS on parallel transmission of SRS and PUSCH/PUCCH for multiple TAGs", 3GPP Draft; 3GPP TSG RAN WG2 Meeting #79bis, R2-124392 R1-124027, 3rd Generation Partnership Project (3GPP), Mobile Competence Centre ; 650, Route Des Lucioles ; F-06921 Sophia-Antipolis Cedex; France, vol. RAN WG2, no. Bratislava, Slovakia; Oct. 8, 2012-Oct. 12, 2012, Sep. 16,

(56) References Cited

OTHER PUBLICATIONS 2012 (Sep. 16, 2012), XP050666902, 2 Pages. Retrieved from the Internet: URL: http://www.3gpp.org/ftp/tsg_ran/WG2_RL2/TSGR2_79bis/LSin/ [retrieved on Sep. 16, 2012].

Wang Y., et al., "System Level Analysis of ACK/NACK Bundling for Multi-Component Carrier LTE-Advanced", Vehicular Technology Conference (VTC Spring), 2011 IEEE 73rd, IEEE, May 15, 2011 (May 15, 2011), pp. 1-5, XP031896896, DOI: 10.1109/VETECS.2011.5956496 ISBN: 978-1-4244-8332-7.

* cited by examiner

ULTRA-LOW LATENCY LTE UPLINK FRAME STRUCTURE

CLAIM OF PRIORITY UNDER 35 U.S.C. §119

The present Application for patent claims priority to Provisional Application No. 62/056,281 entitled "ULTRA-LOW LATENCY LTE UPLINK FRAME STRUCTURE" filed Sep. 26, 2014, Provisional Application No. 62/056,397 entitled "ULTRA-LOW LATENCY LTE CONTROL DATA COMMUNICATION" filed Sep. 26, 2014, and Provisional Application No. 62/056,403 entitled "ULTRA-LOW LATENCY LTE REFERENCE SIGNAL TRANSMISSION" filed Sep. 26, 2014, which are assigned to the assignee hereof and hereby expressly incorporated by reference herein.

BACKGROUND

Described herein are aspects generally related to communication systems, and more particularly, to an uplink frame structure and method of uplink transmission for managing communications with user equipment in a wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In wireless communication systems employing legacy LTE, a plurality of UEs served by a particular eNodeB may be scheduled resources for communicating with the eNodeB over one or more uplink channels, such as a physical uplink control channel (PUCCH), physical uplink shared channel (PUSCH), etc. In legacy LTE, each LTE subframe includes a control region during which the control information is to be transmitted via the PUCCH and a data region during which data is to be transmitted via the PUSCH. In addition, the UEs transmit over the PUCCH and/or PUSCH in transmission time intervals (TTI) on the order of a 1 millisecond subframe.

As UE capabilities and demand for bandwidth increases, lower latency in communications may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for communicating in a wireless network is provided. The method includes receiving an uplink resource grant from a network entity for communicating in the wireless network, determining a transmission time interval (TTI) for an uplink transmission within a subframe based on the uplink resource grant. In an aspect, the TTI includes one or more symbols which are a subset of a plurality of symbols in the subframe. The method further includes transmitting communications to the network entity over resources specified in the uplink resource grant during the TTI.

In another example, a user equipment for communicating in a wireless network is provided. The user equipment includes a transceiver, at least one processor communicatively coupled with the transceiver via a bus for communicating in the wireless network, and a memory communicatively coupled with the at least one processor and/or the transceiver via the bus. The at least one processor and the memory are operable to receive, via the transceiver, an uplink resource grant from a network entity for communicating in the wireless network, determine a TTI for an uplink transmission within a subframe based on the uplink resource grant. In an aspect, the TTI includes one or more symbols which are a subset of a plurality of symbols in the subframe. The at least one processor and the memory are further operable to transmit, via the transceiver, communications to the network entity over resources specified in the uplink resource grant during the TTI.

In another example, a user equipment for communicating in a wireless network is provided including means for receiving an uplink resource grant from a network entity for communicating in the wireless network, means for determining a TTI for an uplink transmission within a subframe based on the uplink resource grant. In an aspect, the TTI includes one or more symbols which are a subset of a plurality of symbols in the subframe. The user equipment further includes means for transmitting communications to the network entity over resources specified in the uplink resource grant during the TTI.

In a further example, a computer-readable storage medium comprising computer-executable code for communicating in a wireless network is provided. The code includes code for receiving an uplink resource grant from a network entity for communicating in the wireless network, code for determining a TTI for an uplink transmission within a subframe based on the uplink resource grant. In an aspect, the TTI includes one or more symbols which are a subset of a plurality of symbols in the subframe. The code further includes code for transmitting communications to the network entity over resources specified in the uplink resource grant during the TTI.

Additionally, in an example, a method for communicating in a wireless network, is provided. The method includes generating an uplink resource grant for a user equipment (UE) to schedule uplink communications for the UE based on a TTI including one or more symbols which are a subset of a plurality of symbols in a subframe, communicating the uplink resource grant to the UE, and receiving uplink communications from the UE during the TTI based on the uplink resource grant.

In another example, an evolved Node B (eNB) for communicating in a wireless network is provided. The eNB includes a transceiver, at least one processor communicatively coupled with the transceiver via a bus for communicating in the wireless network, and a memory communicatively coupled with the at least one processor and/or the transceiver via the bus. The at least one processor and the memory are operable to generate an uplink resource grant for a UE to schedule uplink communications for the UE based on a TTI including one or more symbols which are a subset of a plurality of symbols in a subframe, communicate, via the transceiver, the uplink resource grant to the UE, and receive, via the transceiver, uplink communications from the UE during the TTI based on the uplink resource grant.

In yet another example, an eNB for communicating in a wireless network is provided. The eNB includes means for generating an uplink resource grant for a UE to schedule uplink communications for the UE based on a TTI including one or more symbols which are a subset of a plurality of symbols in a subframe, means for communicating the uplink resource grant to the UE, and means for receiving uplink communications from the UE during the TTI based on the uplink resource grant.

In another example, a computer-readable storage medium comprising computer-executable code for communicating in a wireless network is provided. The code includes code for generating an uplink resource grant for a UE to schedule uplink communications for the UE based on a TTI including one or more symbols which are a subset of a plurality of symbols in a subframe, code for communicating the uplink resource grant to the UE, and code for receiving uplink communications from the UE during the TTI based on the uplink resource grant.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
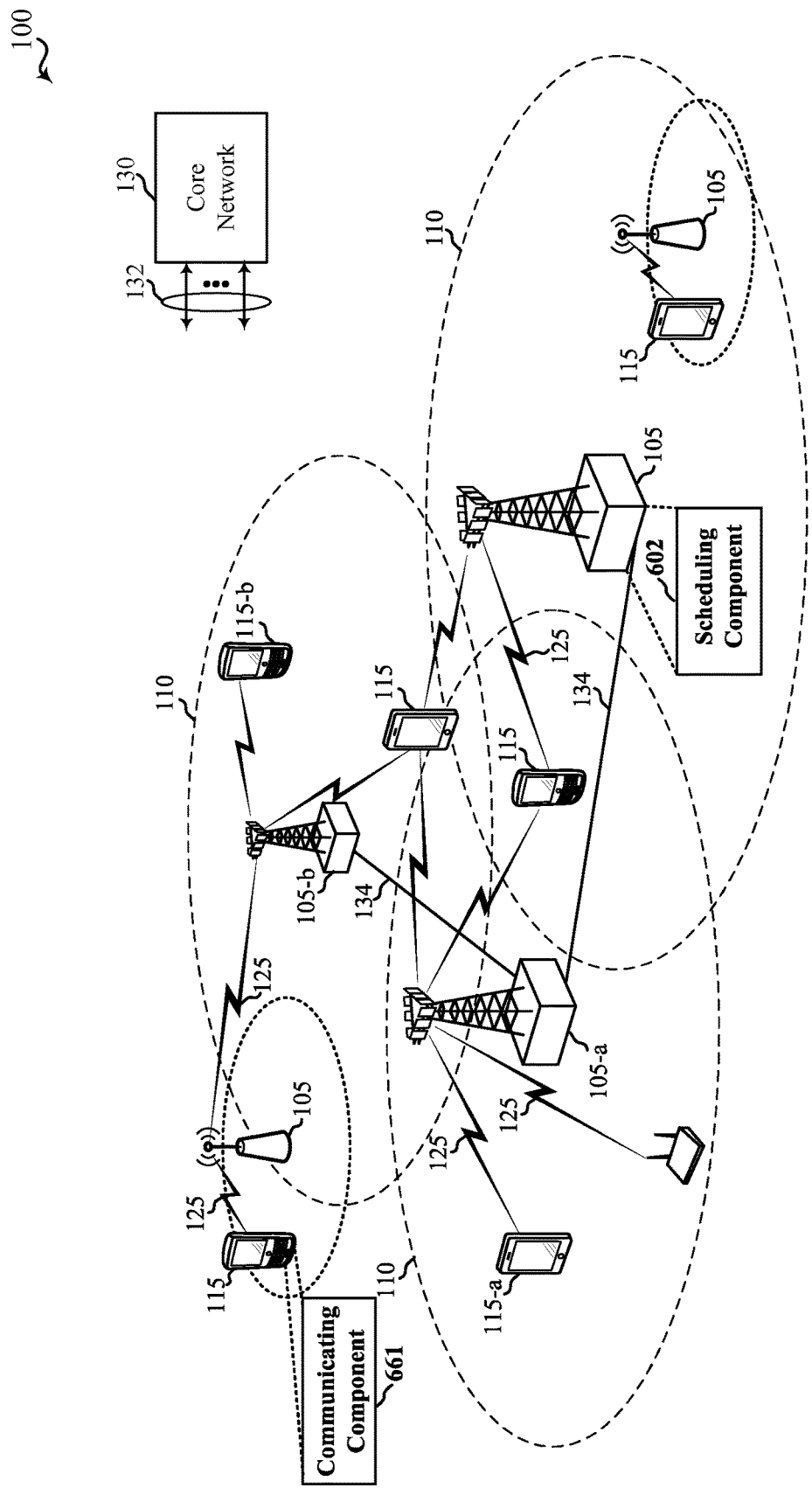
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to communicating in a wireless network according to an uplink frame structure of a lower latency wireless communication technology that is based on a transmission time interval (TTI) having a duration less than that of a legacy wireless communication technology. In this regard, a lower latency in communications is achieved by the shorter, more frequent TTI. For example, where the legacy wireless communication technology is LTE, which has a 1 millisecond (ms) subframe TTI duration, a lower latency wireless communication technology, which is referred to herein as ultra low latency (ULL), may be based on a multiple symbol-level, a symbol-level, or slot-level duration (e.g., a duration that is less than a 1 ms subframe). For a 1 symbol TTI, for example, ULL can achieve a latency that is around 14 times lower than LTE for normal cyclic prefix (CP), and around 12 times lower than LTE for extended CP. It is to be appreciated that CP can relate to a portion of information in a symbol that is appended to the symbol to allow for determining whether the symbol is properly received. Normal CP can extend a symbol by around 4.7 microseconds (us), and thus results in 7 symbols in a 0.5 ms slot (14 symbols in a 1 ms subframe) for LTE communications. Extended CP can extend a symbol by around 16.67 us, and thus results in 6 symbols in a 0.5 ms slot (12 symbols in a 1 ms subframe) for LTE communications. In addition, a latency related to an amount of time to transmit hybrid automatic repeat/request (HARQ) feedback as part of a HARQ processes in ULL is accordingly reduced, as compared to a HARQ latency for LTE, as well.

In one example, the frame structure for ULL can be designed to coexist with the legacy wireless communication technology on which the ULL is based (e.g., at least a evolved Node B (eNB)). Accordingly, for example, the frame structure for ULL can be defined within a frequency band of the legacy wireless communication technology, and/or within a data portion of resources (e.g., excluding a portion of resources assigned for control data communication) in the legacy wireless communication technology). Moreover, at least a part of the data portion of resources, in this regard, can be divided into control and data communications for ULL, which can further be divided into one or more resource blocks (RB) groups each comprising a plurality of RBs. Thus, a control and data region may also be defined over the RB groups for ULL communications. The control channel for ULL can be referred to herein as ULL PUCCH (uPUCCH), and the data channel for ULL can be referred to herein as ULL PUSCH (uPUSCH). Moreover, a region for transmission of ULL reference signals (uRS) may also be defined within the data region of the legacy wireless communication technology. In addition, where a UE supports both ULL and the legacy wireless communication technology in this regard, collision avoidance may be utilized by prioritizing one or both of the ULL or legacy wireless communication technology communications in one or more TTIs where the UE may be assigned conflicting resources for ULL and legacy wireless communications.

Referring first to FIG. 1, a diagram illustrates an example of a wireless communications system 100, in accordance with an aspect of the present disclosure. The wireless communications system 100 includes a plurality of access points (e.g., base stations, eNBs, or WLAN access points) 105, a number of user equipment (UEs) 115, and a core network 130. Access points 105 may include a scheduling component 602 configured to communicate resource grants to UEs 115 using a ULL frame structure, for example but not limited to frame structure 800 (FIG. 8), frame structure 900 (FIG. 9), frame structure 1100 (FIG. 11), etc., as described herein, which may include a TTI of one symbol (e.g., as shown in timelines 700, 702 in FIG. 7). For example, the ULL frame structure may include one or both of a uPUCCH and a uPUSCH, respectively. Similarly, one or more of UEs 115 may include a communicating component 661 configured to receive, decode, transmit, and operate using the ULL frame structure. Some of the access points 105 may communicate with the UEs 115 under the control of a base station controller (not shown), which may be part of the core network 130 (e.g., wireless network) or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals (RS), control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples a hybrid UE 115-a may communicate with access point 105-a on both a first hierarchical layer that supports first layer transmissions with a first subframe type and a second hierarchical layer that supports second layer transmissions with a second subframe type. For example, access point 105-a may transmit subframes of the second subframe type that are time division duplexed with subframes of the first subframe type.

In some examples, hybrid UE 115-a may acknowledge receipt of a transmission by providing an acknowledgement (ACK), or acknowledge receipt of but inability to properly decode the transmission by providing a negative-acknowledgement (NACK) for the transmission through, for example, a HARQ scheme. Acknowledgements from hybrid UE 115-a for transmissions in the first hierarchical layer may be provided, in some examples, after a predefined number of subframes following the subframe in which the transmission was received. The hybrid UE 115-a, when operating in the second hierarchical layer may, in examples, acknowledge receipt in a same subframe as the subframe in which the transmission was received. The time required to transmit an ACK/NACK and receive a retransmission may be referred to as round trip time (RTT), and thus subframes of the second subframe type may have a second RTT that is shorter than a RTT for subframes of the first subframe type.

In other examples, a second layer UE 115-b may communicate with access point 105-b on the second hierarchical layer only. Thus, hybrid UE 115-a and second layer UE 115-b may belong to a second class of UEs 115 that may communicate on the second hierarchical layer, while legacy UEs 115 may belong to a first class of UEs 115 that may communicate on the first hierarchical layer only. Access point 105-b and UE 115-b may communicate on the second hierarchical layer through transmissions of subframes of the second subframe type. Access point 105-b may transmit subframes of the second subframe type exclusively, or may transmit one or more subframes of the first subframe type on the first hierarchical layer that are time division multiplexed with subframes of the second subframe type. Second layer UE 115-b, in the event that access point 105-b transmits subframes of the first subframe type, may ignore such subframes of the first subframe type. Thus, second layer UE 115-b may acknowledge receipt of transmissions in a same subframe as the subframe in which the transmissions are received. Thus, second layer UE 115-b may operate with reduced latency compared to UEs 115 that operate on the first hierarchical layer.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A and/or ULL LTE network communication systems, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul link 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-*a*, and/or second layer UE 115-*b* may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
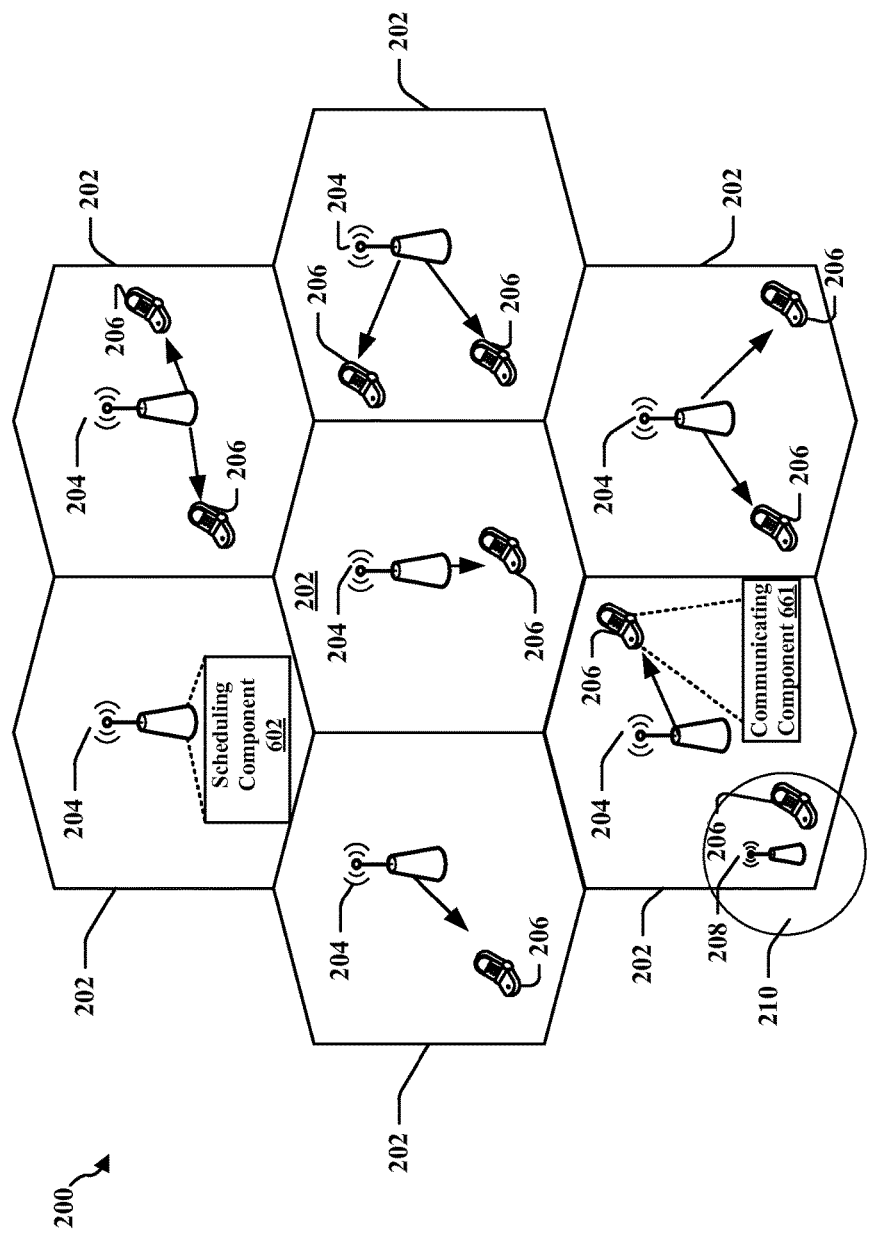
FIG. 2 is a diagram illustrating an example of an access network.

FIG. 2 is a diagram illustrating an example of an access network 200 in an LTE or ULL LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 may include a scheduling component 602 configured to communicate resource grants to UEs 206 using a ULL frame structure, for example but not limited to frame structure 800 (FIG. 8), frame structure 900 (FIG. 9), frame structure 1100 (FIG. 11), etc., which may include a TTI of one symbol (e.g., as shown in timelines 700, 702 in FIG. 7). Similarly, one or more of UEs 206 may include a communicating component 661 configured to receive, decode, transmit, and operate using the ULL frame structure. There is no centralized controller in this example of an access network 200, but a centralized controller may be used in alternative configurations. The eNBs 204 are responsible for all radio related functions including radio bearer control, admission control, mobility control, scheduling, security, and connectivity to a serving gateway.

The modulation and multiple access scheme employed by the access network 200 may vary depending on the particular telecommunications standard being deployed. In LTE or ULL LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a discrete Fourier transform (DFT)-spread OFDM signal to compensate for high peak-to-average power ratio (PAPR).

Figure 3:
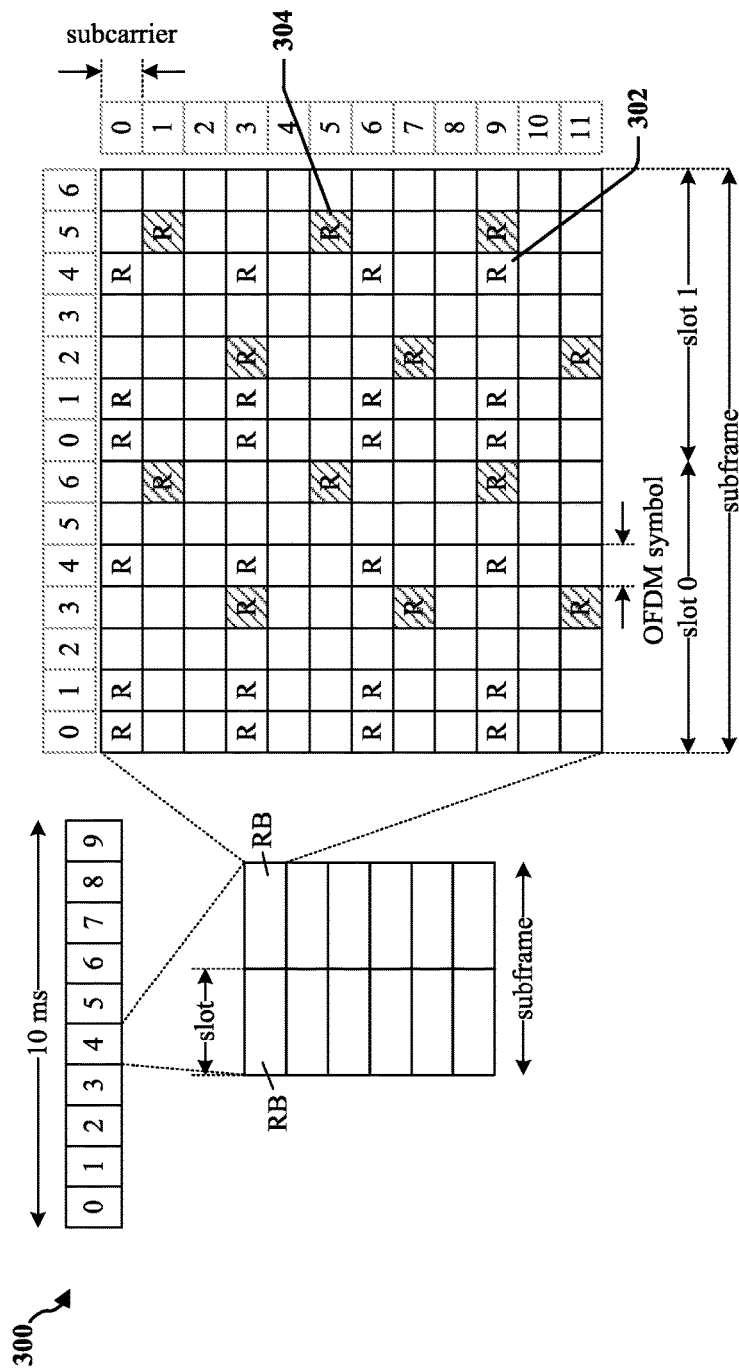
FIG. 3 is a diagram illustrating an example of a downlink (DL) frame structure in long term evolution (LTE).

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource element block (also referred to herein as a RB). The resource grid is divided into multiple resource elements. In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding PDSCH is mapped. The number of bits carried by each resource element depends on the modulation scheme. Thus, the more resource element blocks that a UE receives and the higher the modulation scheme, the higher the data rate for the UE.

Figure 4:
FIG. 4 is a diagram illustrating an example of an uplink (UL) frame structure in LTE.

FIG. 4 is a diagram 400 illustrating an example of an UL frame structure in LTE, which, in some examples, may be utilized in conjunction with the ULL LTE UL frame structure described herein. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410a, 410b in the control section to transmit control information to an eNB. The UE may also be assigned resource element blocks 420a, 420b in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span both slots of a subframe and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
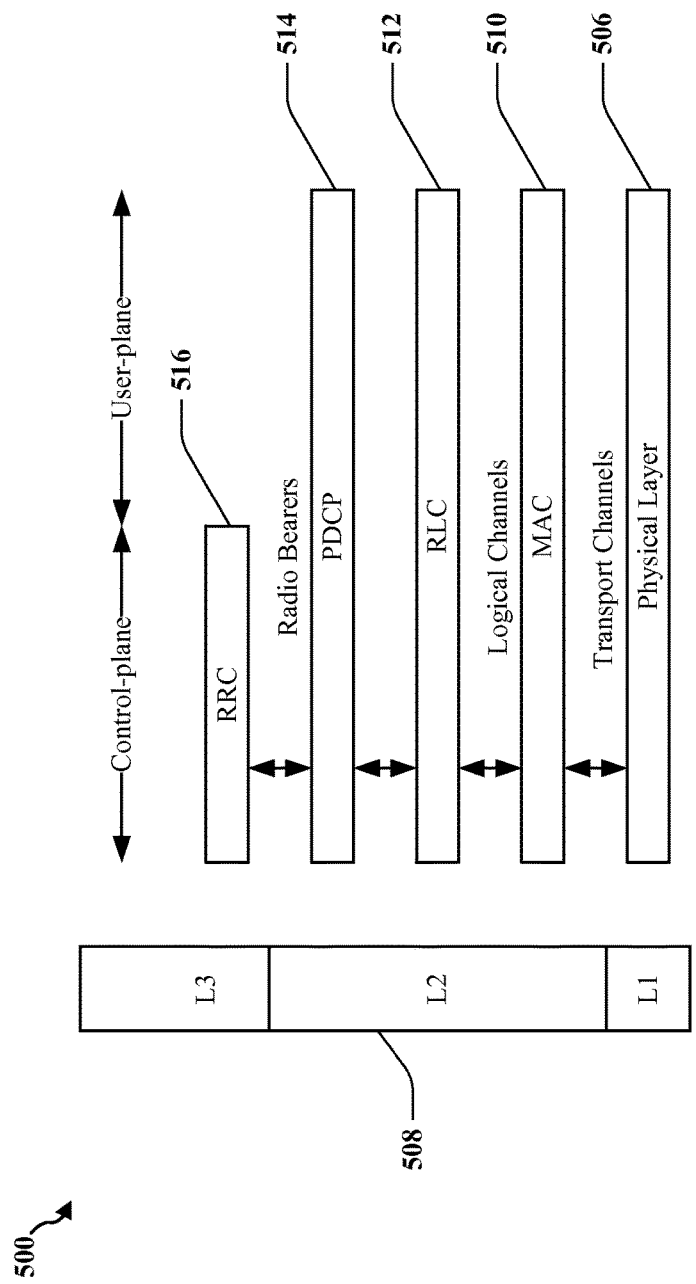
FIG. 5 is a diagram illustrating an example of a radio protocol architecture for the user and control planes.

FIG. 5 is a diagram 500 illustrating an example of a radio protocol architecture for the user and control planes in LTE and ULL LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at a PDN gateway on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
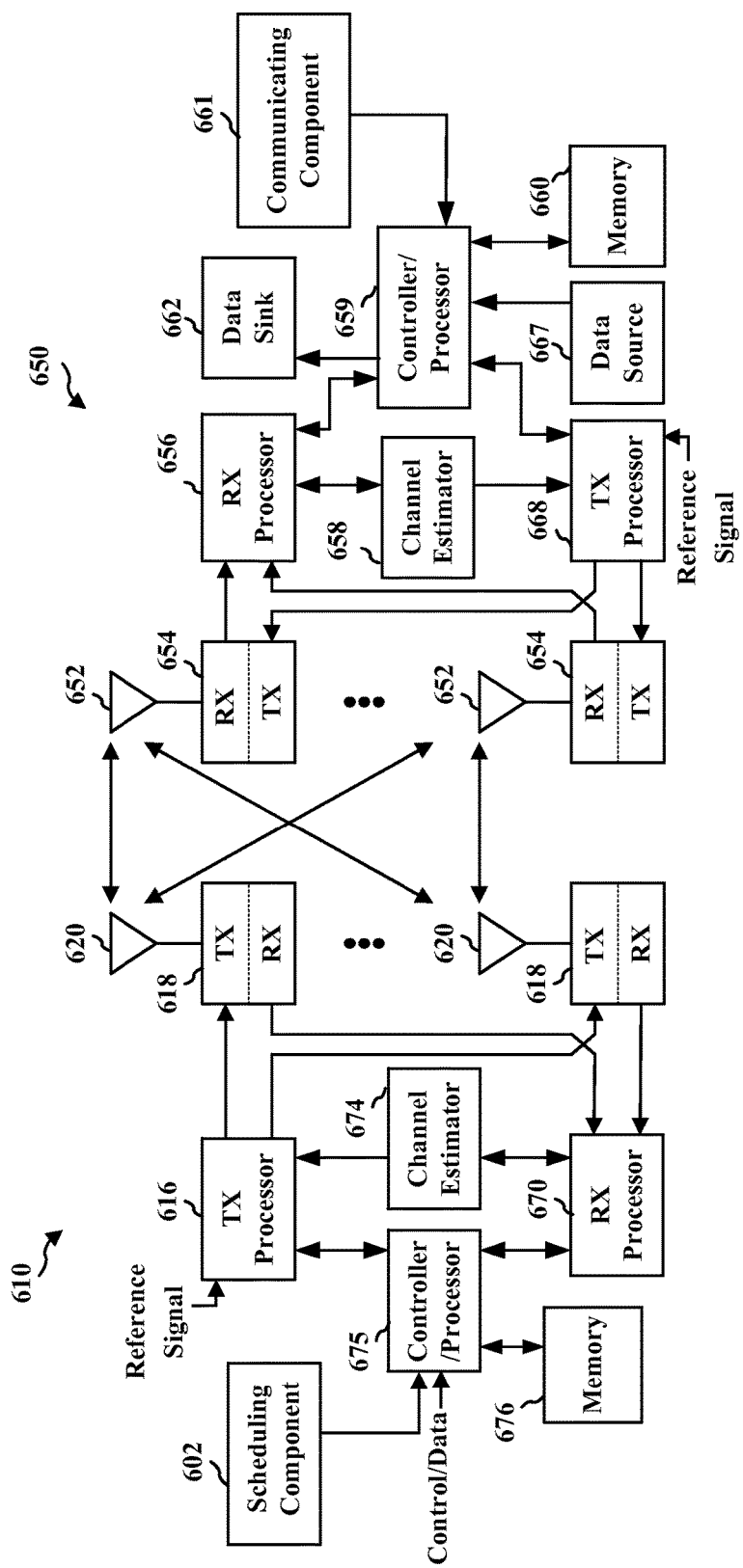
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. In addition, eNB 610 may include a scheduling component 602 configured to communicate resource grants to UE 650 using a ULL frame structure, for example but not limited to frame structure 800 (FIG. 8), frame structure 900 (FIG. 9), frame structure 1100 (FIG. 11), etc., which may include a TTI of one symbol (e.g., as shown in timelines 700, 702 in FIG. 7). Though scheduling component 602 is shown as coupled to controller/processor 675, it is to be appreciated that scheduling component 602 can also be coupled to other processors (e.g., RX processor 670, TX processor 616, etc.) and/or implemented by the one or more processors 616, 670, 675 to perform actions described herein At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations. In addition, UE 650 may include a communicating component 661 configured to receive, decode, transmit, and operate using the ULL frame structure, as described herein. Though communicating component 661 is shown as coupled to controller/processor 659, it is to be appreciated that communicating component 661 can also be coupled to other processors (e.g., RX processor 656, TX processor 668, etc.) and/or implemented by the one or more processors 656, 659, 668 to perform actions described herein In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
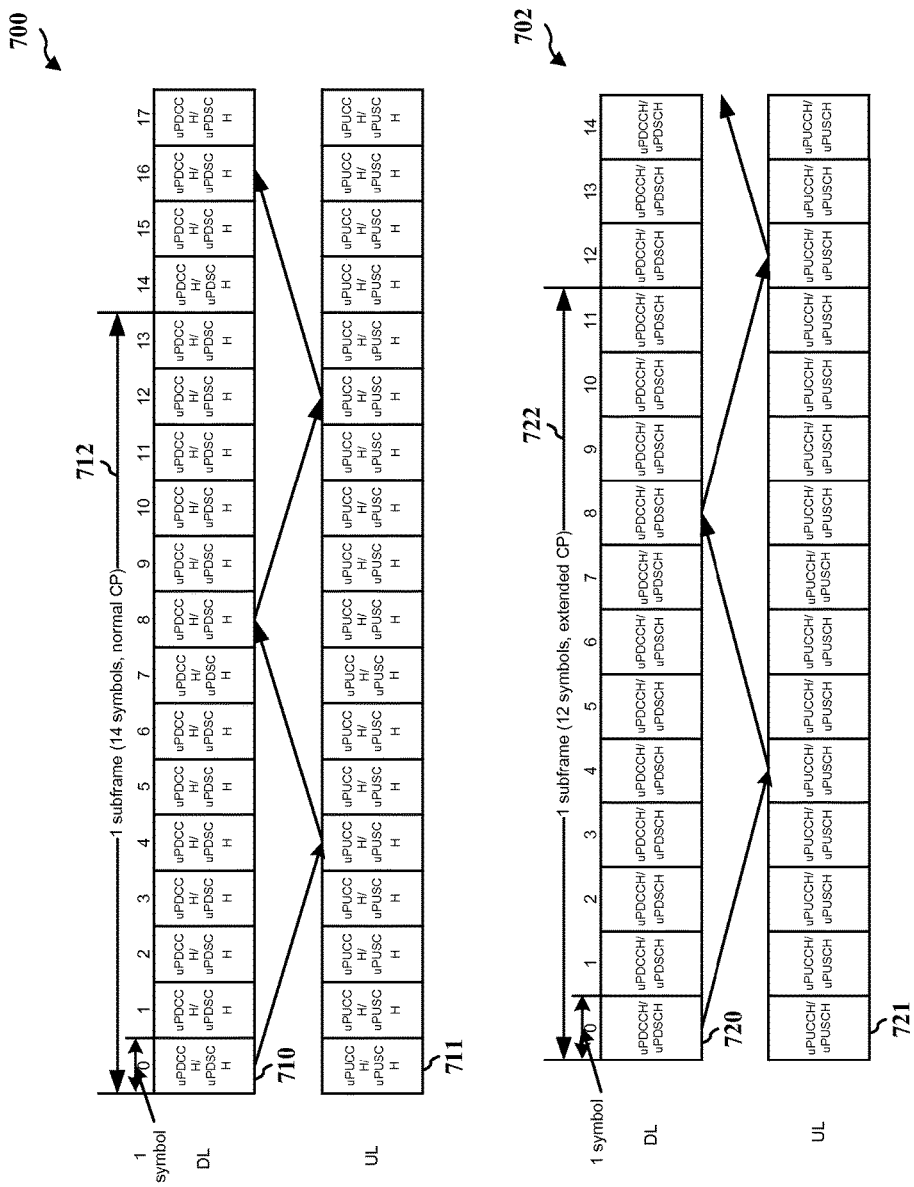
FIG. 7 is a diagram illustrating example timelines for uplink bandwidth allocation.

FIG. 7 is a diagram illustrating non-limiting examples of a ULL timelines 700, 702, with time extending from left to right in the figure, for managing ULL communications in a wireless communication system. In this example, timelines 700, 702 include ULL frames of symbol duration in each symbol of a subframe. Timelines 700, 702 both depict symbols representing a TTI for ULL physical downlink control channel (uPDCCH) and/or ULL physical downlink shared channel (uPDSCH) and symbols representing a TTI including uPUCCH and/or uPDSCH. In timelines 700, 14 symbols 710, 711, etc. are shown within a given subframe 712 (e.g., for normal CP), and in timelines 702, 12 symbols 720, 721, etc. are shown within a given subframe 722 (e.g., for extended CP). In either case, lower latency is achieved in ULL by utilizing symbol-based TTIs (as opposed to subframe-based TTIs in LTE). It is to be appreciated, in other examples, that a TTI may be two or more symbols, a slot of a subframe (where a subframe includes two slots), etc. In addition, HARQ process response time can be on the order of a number of symbols (e.g., 3 symbols, 4 symbols, etc.), a number of sets of symbols (e.g., 3 dual-symbols, 4 dual-symbols, etc.) a number of slots (e.g., 3 slots, 4 slots, etc.), based on the duration of the TTI for ULL communications. In the depicted example, ULL communications are 1 symbol in duration, uPDCCH/uPDSCH is sent in symbol 0, and HARQ is processed and is sent in symbol 4, etc. in the subframe. Thus, an amount of time associated with the HARQ latency in ULL communications is less than a corresponding HARQ latency in LTE communications as well based on the shortened TTI duration.

Figure 8:
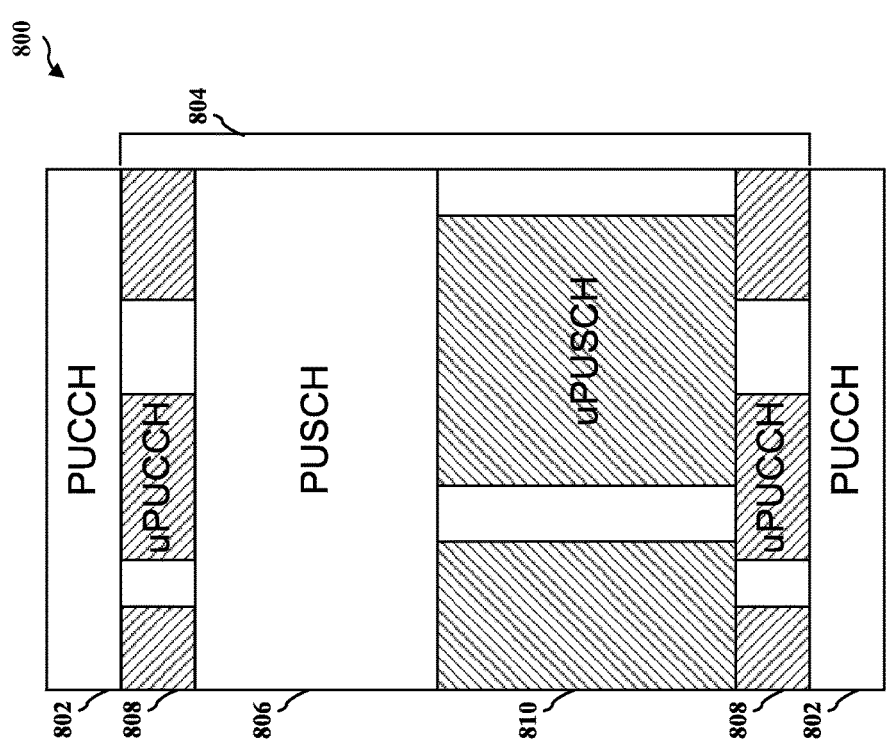
FIG. 8 is a diagram illustrating an example frame structure for a symbol in a ultra low latency (ULL) LTE system.

FIG. 8 illustrates an example frame structure 800 for ULL LTE (and/or LTE) communications. For example, as described, frame structure 800 can represent a symbol duration TTI (e.g., of an OFDM, SC-FDM, or similar symbol, such as a symbol 710, 711, 720, 721, etc. in FIG. 7), a two or more symbol duration TTI, a slot duration TTI, etc., which is represented vertically in frequency (and horizontally in time, as described). In any case, the frame structure for ULL can be defined within a current LTE UL frame structure. For example, frame structure 800 includes PUCCH regions 802 of LTE at the ends of the frame (e.g., in uplink frequency bandwidth), which are undisturbed by the ULL LTE frame structure, in this example. Rather, the ULL frame structure is defined within the PUSCH region 804 in LTE.

As shown in this example, at least some of the LTE PUSCH region 806 is optionally maintained in the LTE PUSCH region 804, and uPUCCH regions 808 and a uPUSCH region 810 are also included in the LTE PUSCH region 804. In this example frame structure 800, the uPUCCH regions 808 are similarly at the ends of the LTE PUSCH region 804 that is usable for ULL. A remainder of the LTE PUSCH region 804 can be divided into the PUSCH region 806 and the uPUSCH region 810 (e.g., based on scheduling by an eNB or other network node). It is to be appreciated that substantially any frame structure may be employed such that LTE and ULL can coexist in a given TTI. Moreover, as described further herein for example, an eNB can allocate resources to one or more UEs according to the regions in the frame structure 800 (and can thus support LTE and/or ULL communications), and a receiving UE may be somewhat agnostic to the frame structure by using resources as allocated to the UE by the eNB.

Figure 9:
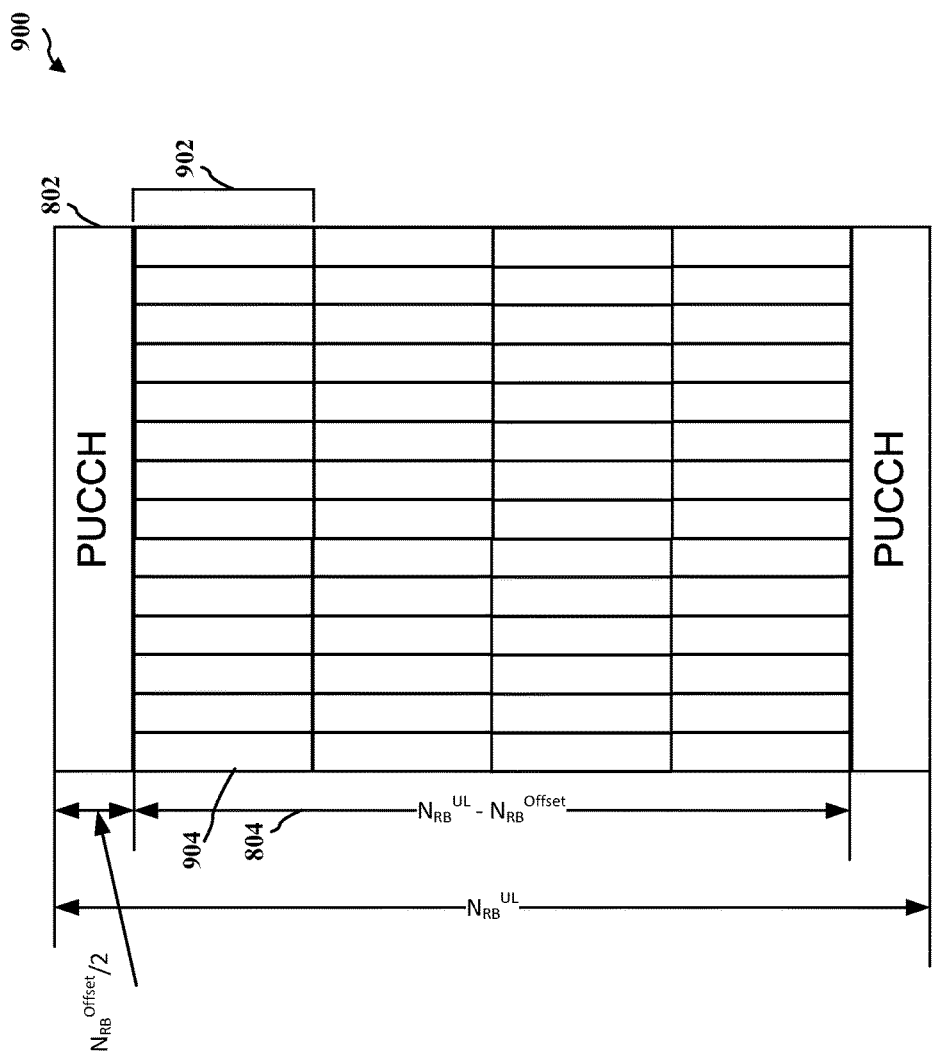
FIG. 9 is a diagram illustrating an example frame structure for a symbol in a ULL LTE system.

FIG. 9 illustrates an example frame structure 900 for ULL (and/or LTE) communications. For example, as described, frame structure 900 can represent a symbol duration TTI (e.g., of an OFDM, SC-FDM, or similar symbol, such as a symbol 710, 711, 720, 721, etc. in FIG. 7), a two or more symbol duration TTI, a slot duration TTI, etc., which is represented vertically in frequency (and horizontally in time, as described). In any case, as described, the frame structure for ULL can be defined within a current LTE UL frame structure. For example, frame structure 900 includes PUCCH regions 802 of LTE at the ends of the frame, which are undisturbed by the ULL LTE frame structure, in this example. Rather, the ULL frame structure is defined within the PUSCH region 804 in LTE.

In this example, the RBs usable for ULL can be defined as the total RBs available for UL communications in the TTI ($N_{RB}^{UL}$) minus an offset ($N_{RB}^{Offset}$), where $N_{RB}^{Offset}$ can be intended to accommodate the combined size of PUCCH regions 802 in LTE and possibly a uPUCCH region in ULL LTE. The RBs usable for ULL communications can be further divided into a number of RB groups, such as RB group 902, which may be contiguous in frequency and may include a number of RBs, such as RB 904. In this example, 4 RB groups of 14 RBs are shown (e.g., much like LTE, but the RBs are divided within a symbol duration, two or more symbol duration, slot duration, etc., instead of a subframe duration). uPUCCH and/or uPUSCH communications can accordingly be scheduled over the RBs in the RB groups (e.g., according to frame structure 800).

In one example, each RB group 902 can include a multiple of 2, 3, 5, etc. RBs where each group can be equal in number of RBs or not. For instance, the number of RBs in the RB group(s) can be based on a configured starting offset (($N_{RB}^{Offset}$), the uPUSCH bandwidth determined for the TTI, and/or the like. One specific example of RB group sizes to achieve certain system bandwidths can be the following:

| uPUSCH Bandwidth (RBs) | RB Group Sizes |
| --- | --- |
| 96 | {24, 24, 24, 24} |
| 88 | {20, 20, 24, 24} |
| 80 | {20, 20, 20, 20} |
| 72 | {18, 18, 18, 18} |
| 64 | {16, 16, 16, 16} |
| 56 | {12, 12, 16, 16} |
| 48 | {24, 24} |
| 40 | {20, 20} |
| 32 | {16, 16} |
| 24 | {24} |
| 16 | {16} |
| 12 | {12} |

In addition, for example, the number of RBs can be similar for certain symbol types (e.g., symbols that do not include a sounding reference signal (SRS) (also referred to herein as "non-SRS symbols")), but symbols of a symbol type that do include an SRS (also referred to herein as "SRS symbols") may have a number of RBs associated with specific SRS bandwidth. For example, current LTE cell-specific SRS bandwidth may be the following for 5/10/15/20 megahertz (MHz): 5 MHz supports 36/32/24/20/16/12/8/4 RBs for SRS, 10 MHz supports 48/40/36/32/24/20/16 RBs for SRS, 15 MHz supports 72/64/60/48/40/36/32 RBs for SRS, and 20 MHz supports 96/80/72/64/60/48 RBs for cell-specific SRS. In addition, in an example, the number of RBs and/or RB groups for uPUSCH can be accordingly adjusted based in part on the bandwidth for the SRS in ULL where the uPUSCH includes a cell-specific SRS. Note that for the cases when the cell-specific SRS bandwidth is small (e.g., 4 RBs or 8 RBs), uPUSCH transmissions may or may not be supported in SRS symbols. Alternatively, in such cases, uPUSCH may be supported but may not follow the RB group management as in non-SRS symbols. For example, if the cell-specific SRS bandwidth is 16 RBs in a 100 RB uplink bandwidth, uPUSCH may be assigned by excluding the 16 RB cell-specific SRS bandwidth, and dividing the remaining 84 RBs into 4 groups. As another example, if the cell-specific SRS bandwidth is 16 RBs in a 100 RB uplink bandwidth, uPUSCH may be assigned by using the 16 RB as a group, and dividing the remaining 84 RBs into 3 other groups.

In any case, an eNB can assign resources to one or more UEs according to the determined bandwidth for uPUSCH based on a corresponding number of RBs in one or more RB groups within the TTI using the frame structures 800 and/or 900 shown above.

Figure 10:
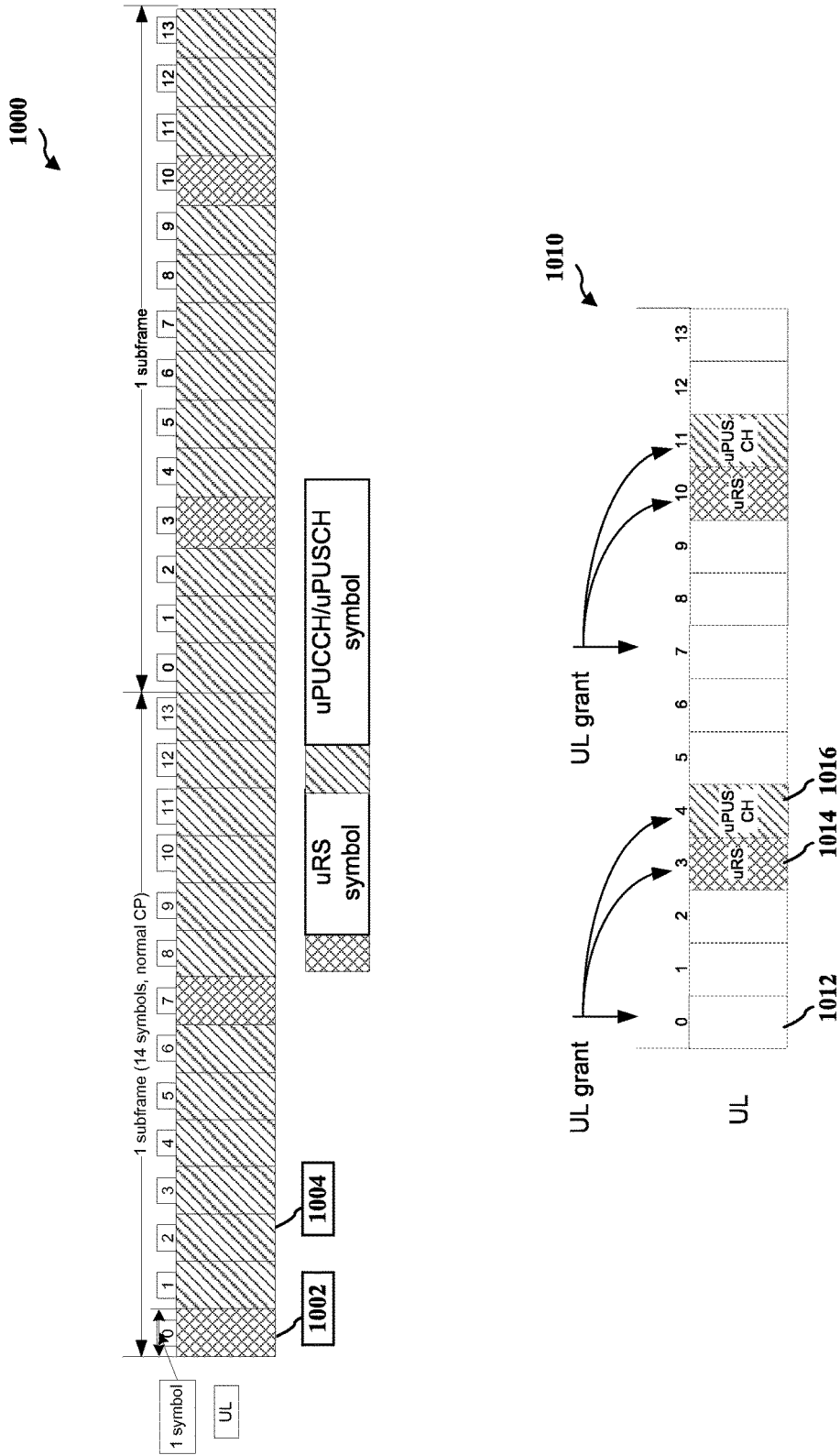
FIG. 10 is a diagram illustrating example timelines for uplink bandwidth allocation.

FIG. 10 illustrates example timelines 1000, 1010 for RS transmission in ULL communications. Timeline 1000 includes transmission of uPUCCH/uPUSCH 1004 in ULL frames that are of a symbol duration in an LTE subframe. In addition, ULL RS (also referred to as uRS) transmissions 1002 are depicted in timeline 1000 at different symbols. It is to be appreciated, as described, that transmission of uRS for a given UE can occur without transmission of uPUCCH and/or uPUSCH. In timeline 1000, transmission of uRS can be periodic (e.g., every 6 then 9 symbols), though transmission may be aperiodic as well. In either case, as described further below, triggering of uRS transmission can be specified by the eNB (e.g., in one or more resource grants to the UE or otherwise, as described herein).

Timeline 1010 depicts an uplink grant received at symbol 1012, which can specify a uRS transmission in symbol 1014 and uPUSCH transmission in symbol 1016. Transmission of uRS can be aperiodic, in this example, such that the uplink grant triggers transmission of the uRS (and thus uRS is based on receiving the uplink grant and not necessarily on a certain period). In one example, transmission of uRS in symbol 1014 can be associated with transmission of uPUSCH in symbol 1016. For example, where resource grant in symbol 1012 specifies uPUSCH transmission in symbol 1016 and a uRS trigger, the UE can determine to transmit uRS in the preceding symbol 1014 based on receiving a uRS trigger in the grant. In this regard, for example, the trigger may specify a number of symbols (or more generally, TTIs) before the symbol related to the uplink resource grant for transmitting the uRS. Although not shown, the same UE may be scheduled with another uPUSCH transmission without uRS being triggered, e.g., the symbol right after symbol 1016. In this case, this uPUSCH transmission can rely on uRS in symbol 1012 for demodulation. Although not shown, it is also possible to schedule uRS transmission in one or more symbols without the accompanying uPUSCH or uPUCCH.

Figure 11:
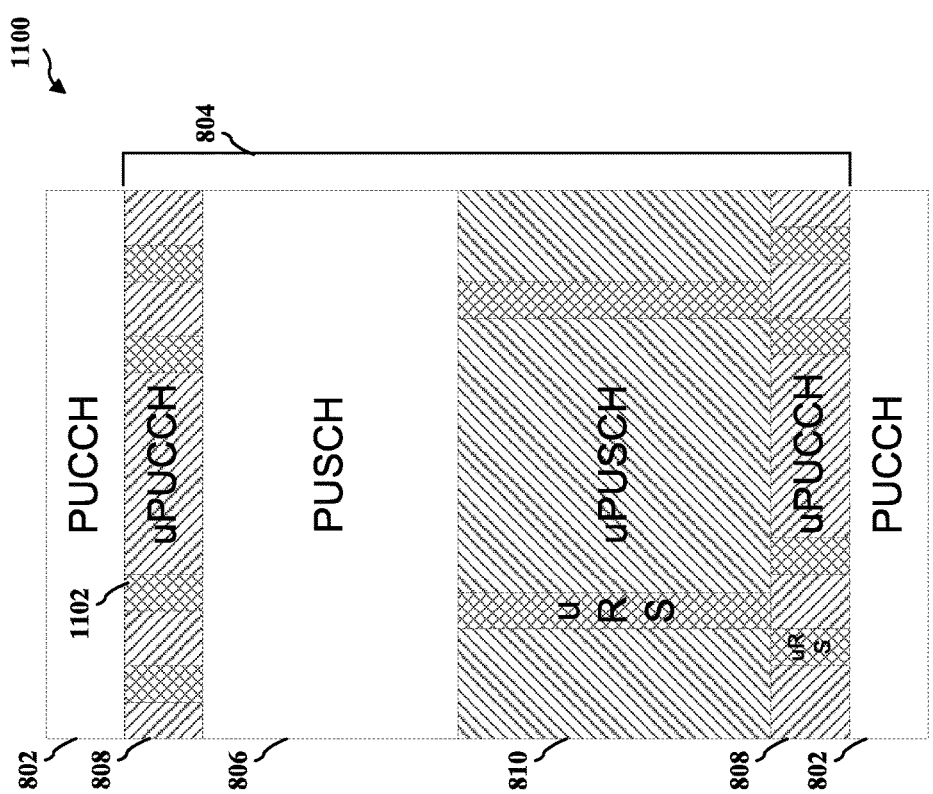
FIG. 11 is a diagram illustrating an example frame structure for a symbol in a ULL LTE system.

FIG. 11 illustrates an example frame structure 1100 for ULL communications. For example, as described, frame structure 1100 can represent a symbol duration TTI (e.g., of an OFDM, SC-FDM, or similar symbol), a two or more symbol duration TTI, a slot duration TTI, etc. In any case, frame structure 1100 can be defined within a current LTE UL frame structure, and may be similar to frame structure 800 (FIG. 8). For example, frame structure 1100 includes PUCCH regions 802 at the ends of the frame, which are undisturbed by the ULL frame structure, in this example. Rather, the ULL frame structure is defined within the PUSCH region 804 in LTE. Thus, as shown, a PUSCH region 806 is optionally maintained in the LTE PUSCH region 804, and uPUCCH regions 808 and a uPUSCH region 810 are also included. In this example frame structure 1100, the uPUCCH regions 808 are similarly at the ends of the LTE PUSCH region 804 that is usable for ULL. A remainder of the LTE PUSCH region 804 is divided into the PUSCH region 806 and the uPUSCH region 810.

In addition, uRS regions 1102 are defined within the uPUCCH regions 808 and the uPUSCH regions 810 for transmitting uRS based on a received trigger, as described further herein. Additionally, in this regard, uRS can be transmitted for both uPUCCH and uPUSCH (e.g., uRS for uPUCCH can be a DM-RS to assist in demodulating communications over the uPUCCH, and uRS for uPUSCH can be a DM-RS to assist in demodulating communications over the uPUSCH). uRS for uPUCCH may be narrowband and in a semi-static frequency location, as depicted in the uRS regions 1102 in uPUCCH regions 808, while uRS for PUSCH may be wideband and potentially in dynamic frequency locations, as depicted in the uRS regions 1102 in the uPUSCH region 810. In this regard, the uRS may have at least one of a bandwidth size, a frequency location, a number of antenna ports, etc. consistent with that of uPUCCH or uPUSCH. It is to be appreciated that substantially any frame structure may be employed such that LTE and ULL can coexist in a given TTI. Moreover, as described further herein for example, an eNB can allocate resources according to the frame structure 1100 (and can thus support LTE and/or ULL communications), and a receiving UE may be somewhat agnostic to the frame structure by using resources as allocated by the eNB.

Referring to FIGS. 12-18, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 13-18 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Figure 12:
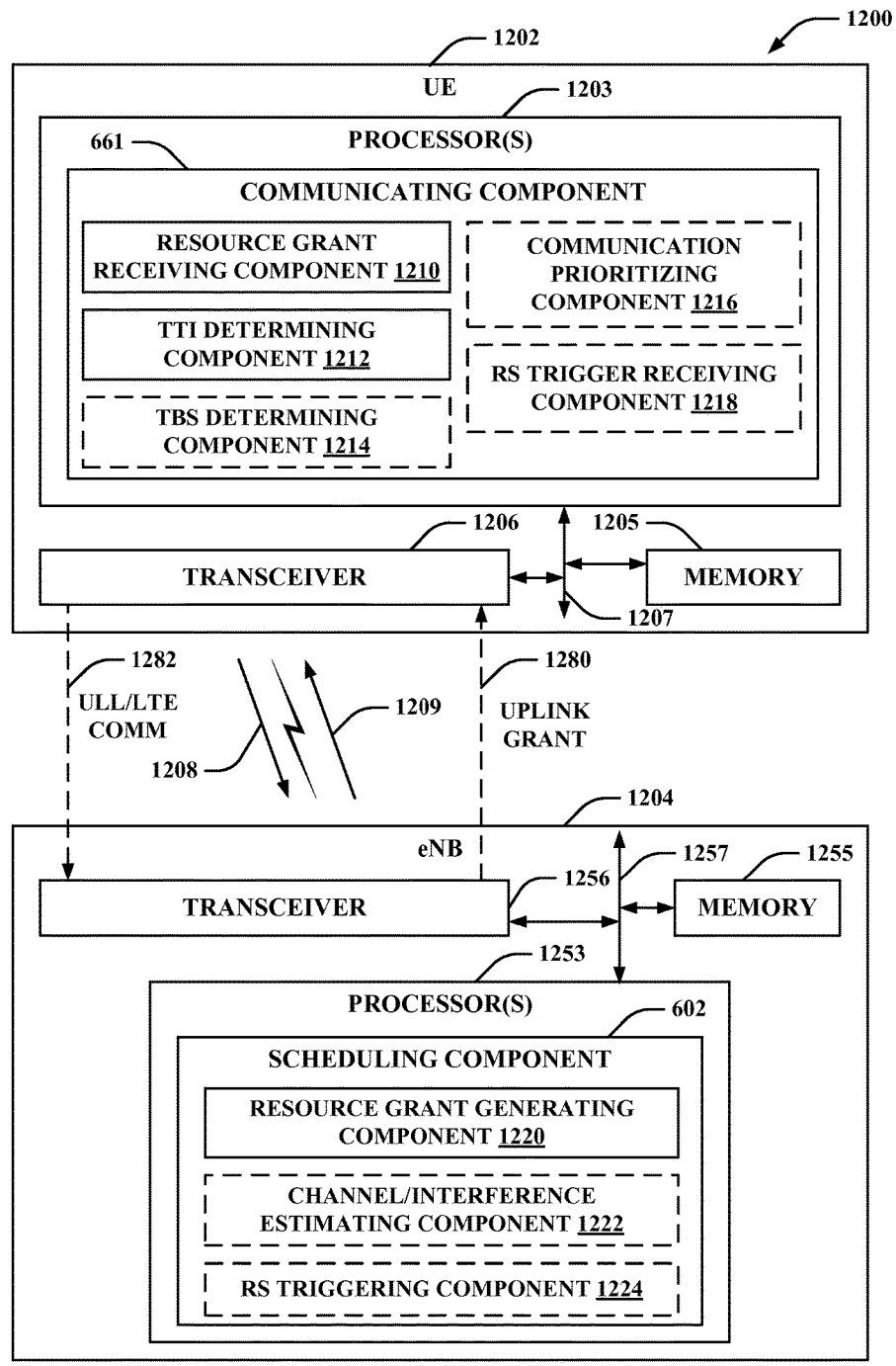
FIG. 12 is a diagram illustrating an example system for communicating using a ULL radio access technology in accordance with aspects described herein.

FIG. 12 illustrates an example system 1200 for communicating in a wireless network using ULL. System 1200 includes a UE 1202 that communicates with an eNB 1204 to access a wireless network, examples of which are described in FIGS. 1, 2, 6, etc., above. UE 1202 can communicate with a wireless network (e.g., core network 130) via eNB 1204. In an aspect, eNB 1204 and UE 1202 may have established one or more downlink channels over which downlink signals 1209 can be transmitted by eNB 1204 (e.g., via transceiver 1256) and received by UE 1202 (e.g., via transceiver 1206) for communicating control and/or data messages (e.g., signaling) from the eNB 1204 to the UE 1202 over configured communication resources. Moreover, for example, eNB 1204 and UE 1202 may have established one or more uplink channels over which uplink signals 1208 can be transmitted by UE 1202 (e.g., via transceiver 1206) and received by eNB 1204 (e.g., via transceiver 1256) for communicating control and/or data messages (e.g., signaling) from the UE 1202 to the eNB 1204 over configured communication resources. For example, eNB 1204 may communicate uplink resource grants 1280 to the UE 1202, which can indicate resources over which the UE 1202 can transmit ULL and/or LTE communications 1282 to the eNB 1204 (e.g., along with related control data, reference signals, etc.), as described herein.

In an aspect, UE 1202 may include one or more processors 1203 and/or a memory 1205 that may be communicatively coupled, e.g., via one or more buses 1207, and may operate in conjunction with or otherwise implement a communicating component 661 for receiving and transmitting ULL communications with one or more eNBs or other network nodes, as described herein, which may include receiving ULL resource grants from eNB 1204 for downlink or uplink ULL channels and communicating over the ULL resources. For example, the various operations related to communicating component 661 may be implemented or otherwise executed by one or more processors 1203 and, in an aspect, can be executed by a single processor, while in other aspects, different ones of the operations may be executed by a combination of two or more different processors. For example, in an aspect, the one or more processors 1203 may include any one or any combination of a modem processor, or a baseband processor, or a digital signal processor, or an application specific integrated circuit (ASIC), or a transmit processor, receive processor, or a transceiver processor associated with transceiver 1206. Further, for example, the memory 1205 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 1203. Moreover, memory 1205 or computer-readable storage medium may be resident in the one or more processors 1203, external to the one or more processors 1203, distributed across multiple entities including the one or more processors 1203, etc.

In particular, the one or more processors 1203 and/or memory 1205 may execute actions or operations defined by communicating component 661 or its subcomponents. For instance, the one or more processors 1203 and/or memory 1205 may execute actions or operations defined by a resource grant receiving component 1210 for obtaining resource grants from eNB 1204. In an aspect, for example, resource grant receiving component 1210 may include hardware (e.g., one or more processor modules of the one or more processors 1203) and/or computer-readable code or instructions stored in memory 1205 and executable by at least one of the one or more processors 1203 to perform the specially configured resource grant receiving and/or processing operations described herein. Further, for instance, the one or more processors 1203 and/or memory 1205 may execute actions or operations defined by a TTI determining component 1212 for determining a TTI associated with the resource grants. In an aspect, for example, TTI determining component 1212 may include hardware (e.g., one or more processor modules of the one or more processors 1203) and/or computer-readable code or instructions stored in memory 1205 and executable by at least one of the one or more processors 1203 to perform the specially configured TTI determining described herein. Further, for instance, the one or more processors 1203 and/or memory 1205 may optionally execute actions or operations defined by an optional transport block size (TBS) determining component 1214 for determining a TBS, TBS scaling factor, and/or the like for transmitting communications over the granted resources. In an aspect, for example, TBS determining component 1214 may include hardware (e.g., one or more processor modules of the one or more processors 1203) and/or computer-readable code or instructions stored in memory 1205 and executable by at least one of the one or more processors 1203 to perform the specially configured TBS determining operations described herein. Further, for instance, the one or more processors 1203 and/or memory 1205 may optionally execute actions or operations defined by an optional communication prioritizing component 1216 for determining whether to prioritize ULL communications or communications over a legacy wireless technology. In an aspect, for example, communication prioritizing component 1216 may include hardware (e.g., one or more processor modules of the one or more processors 1203) and/or computer-readable code or instructions stored in memory 1205 and executable by at least one of the one or more processors 1203 to perform the specially configured communication prioritizing operations described herein. Further, for instance, the one or more processors 1203 and/or memory 1205 may optionally execute actions or operations defined by an optional RS trigger receiving component 1218 for obtaining a trigger to transmit one or more RSs. In an aspect, for example, RS trigger receiving component 1218 may include hardware (e.g., one or more processor modules of the one or more processors 1203) and/or computer-readable code or instructions stored in memory 1205 and executable by at least one of the one or more processors 1203 to perform the specially configured RS triggering operations described herein.

Similarly, in an aspect, eNB 1204 may include one or more processors 1253 and/or a memory 1255 that may be communicatively coupled, e.g., via one or more buses 1257, and may operate in conjunction with or otherwise implement a one or more of a scheduling component 602 for communicating with a UE 1202 over assigned ULL resources, as described herein, which may include providing the resource grants for UE 1202 and/or other UEs according to the ULL resources. For example, the various functions related to scheduling component 602 may be implemented or otherwise executed by one or more processors 1253 and, in an aspect, can be executed by a single processor, while in other aspects, different ones of the functions may be executed by a combination of two or more different processors, as described above. It is to be appreciated, in one example, that the one or more processors 1253 and/or memory 1255 may be configured as described in examples above with respect to the one or more processors 1203 and/or memory 1205 of UE 1202.

In an example, the one or more processors 1253 and/or memory 1255 may execute actions or operations defined by scheduling component 602 or its subcomponents. For instance, the one or more processors 1253 and/or memory 1255 may execute actions or operations defined by a resource grant generating component 1220 for generating one or more resource grants according to a ULL frame structure for one or more UEs. In an aspect, for example, resource grant generating component 1220 may include hardware (e.g., one or more processor modules of the one or more processors 1253) and/or computer-readable code or instructions stored in memory 1255 and executable by at least one of the one or more processors 1253 to perform the specially configured resource grant generating operations described herein. Further, for instance, the one or more processors 1253 and/or memory 1255 may execute actions or operations defined by an optional channel/interference estimating component 1222 for estimating a channel or interference in communications received over the resource grants from the one or more UEs. In an aspect, for example, channel/interference estimating component 1222 may include hardware (e.g., one or more processor modules of the one or more processors 1253) and/or computer-readable code or instructions stored in memory 1255 and executable by at least one of the one or more processors 1253 to perform the specially configured channel and/or interference estimating operations described herein. Further, for instance, the one or more processors 1253 and/or memory 1255 may optionally execute actions or operations defined by an optional RS triggering component 1224 for triggering RS transmission by one or more UEs. In an aspect, for example, RS triggering component 1224 may include hardware (e.g., one or more processor modules of the one or more processors 1253) and/or computer-readable code or instructions stored in memory 1255 and executable by at least one of the one or more processors 1253 to perform the specially configured SDI request receiving operations described herein.

It is to be appreciated that transceivers 1206, 1256 may be configured to transmit and receive wireless signals through one or more antennas, an RF front end, one or more transmitters, and one or more receivers. In an aspect, transceivers 404, 454 may be tuned to operate at specified frequencies such that UE 1202 and/or eNB 1204 can communicate at a certain frequency. In an aspect, the one or more processors 1203 may configure transceiver 1206 and/or one or more processors 1253 may configure transceiver 1256 to operate at a specified frequency and power level based on a configuration, a communication protocol, etc. to communicate uplink signals 1208 and/or downlink signals 1209, respectively, over related uplink or downlink communication channels.

In an aspect, transceivers 1206, 1256 can operate in multiple bands (e.g., using a multiband-multimode modem, not shown) such to process digital data sent and received using transceivers 1206, 1256. In an aspect, transceivers 1206, 1256 can be multiband and be configured to support multiple frequency bands for a specific communications protocol. In an aspect, transceivers 1206, 1256 can be configured to support multiple operating networks and communications protocols. Thus, for example, transceivers 1206, 1256 may enable transmission and/or reception of signals based on a specified modem configuration.

Figure 13:
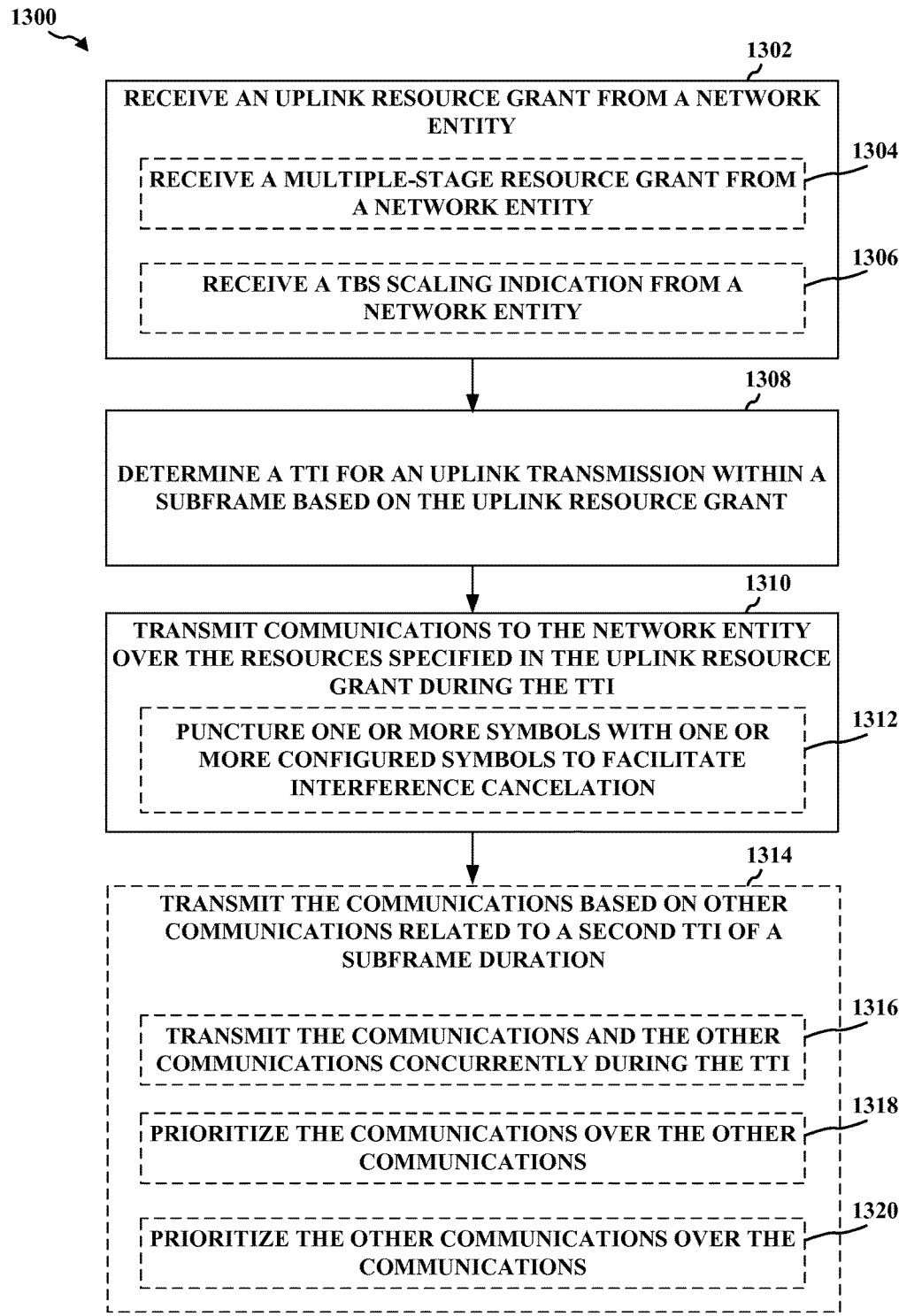
FIG. 13 is a diagram illustrating an example method for transmitting communications based on a ULL resource grant in accordance with aspects described herein.

In one example of scheduling ULL resources, FIG. 13 illustrates a method 1300 for transmitting communications (e.g., by a UE 1202) according to a received ULL resource grant. At Block 1302, a UE may receive an uplink resource grant from a network entity for communicating in a wireless network. Resource grant receiving component 1210 (FIG. 12) can receive the uplink resource grant (e.g., uplink resource grant 1280) from the network entity (e.g., eNB 1204) for communicating in the wireless network. As described, for example, eNB can transmit the uplink resource grant as a downlink signal 1209 to UE 1202 via transceiver 1256, which can be received by transceiver 1206 and provided to one or more processors 1203 for processing. For example, the resource grant can correspond to a ULL resource grant, which can be defined according to a ULL frame structure(s) corresponding to a TTI that has a duration that is less than a duration of a legacy wireless communication technology (e.g., a symbol duration, two or more symbols duration, slot duration, etc. of an LTE subframe). In one example, the ULL resource grant can be defined according to the ULL frame structure(s) 800 (FIG. 8) and/or 900 (FIG. 9), described above, and can thus include a number of RBs and/or RB groups within the TTI. Additionally, in this regard for example, resource grant generating component 1220 (FIG. 12) may generate the resource grant for the UE 1202 according to the ULL frame structure (e.g., to specify resources in the grant based on the ULL frame structure where the UE 1202 and eNB 1204 may operate based on the ULL frame structure), and scheduling component 602 can communicate (e.g., transmit) the resource grant to UE 1202 via transceiver 1256 for receipt by resource grant receiving component 1210 via transceiver 1206.

In an example, receiving the uplink resource grant at Block 1302 may optionally, at Block 1304, receive a multiple-stage resource grant from a network entity. Resource grant receiving component 1210 can receive the multiple-stage resource grant from the network entity (e.g., eNB 1204, core network 130, etc), which may include receiving the multiple-stage resource grant in multiple separate downlink signals 1209 transmitted by transceiver 1256 for receipt by transceiver 1206 and processing by one or more processors 1203 of UE 1202. For example, the resource grant generated by resource grant generating component 1220 may include a multiple-stage resource grant such that scheduling component 602 transmits grant information in multiple instances of communications to the UE 1202. For example, in a first stage resource grant, resource grant generating component 1220 can include one or more parameters, which may include a modulation and coding scheme (MCS) for uplink grants, a transmit power control (TPC) for uplink communications from the UE 1202, and/or precoding information. Scheduling component 602 can transmit the first stage resource grant to UE 1202, which resource grant receiving component 1210 can receive (e.g., via communicating component 661). In one specific example, the first stage resource grant may be 10-13 bits in length and may be transmitted via PDCCH, enhanced PDCCH (EPDCCH), etc. from eNB 1204 to UE 1202. For example, in the first stage grant, the MCS for uplink resource grants can be 5 bits, the TPC can be 2 bits, and precoding information can be 3-6 bits.

In, a second stage resource grant, resource grant generating component 1220 may include one or more additional parameters, which may include a new data indicator (NDI) to indicate whether the UE 1202 is to retransmit a previous communication or a new communication, a HARQ process identity to indicate a HARQ process to which the NDI relates, a delta MCS to indicate a change in the MCS from the MCS signaled in the first stage resource grant, an RS cyclic shift indicating a cyclic shift to apply to resource blocks over granted resources when transmitting an RS, a ULL RS triggering indicator (e.g., one or more conditions or related parameters for triggering RS transmission as prepared by RS triggering component 1224, which is described further herein), an aperiodic channel state information (CSI) trigger indicating one or more conditions or related parameters for reporting CSI, and/or an indication of the granted resources. Resource grant receiving component 1210 can accordingly receive the multiple stages of the assignment via communicating component 661, and can configure communicating component 661 to transmit communications to the eNB 1204 using parameters specified in the multiple stages of the assignment (e.g., using the MCS, applying the TPC, including a RS according to the RS cyclic shift, communicating CSI upon detecting the trigger, etc.). In a specific example, the second stage resource grant can be 10 bits including a bit differentiating whether the grant is for downlink or uplink that is 1 bit, the NDI as 1 bit, the delta MCS as 1 bit, the RS cyclic shift (which may be a demodulation RS (DM-RS) cyclic shift) of 1 bit (e.g., to indicate whether to implement cyclic shifting of the DM-RS between symbols 0 and 6 for rank 1 communications, or between symbols 0/6 and 3/9 for rank 2 communications), the uRS triggering indication of 1 bit, the aperiodic CS trigger of 1 bit, and/or the resource allocation of 4 bits.

In addition, in one example, receiving the uplink resource grant at Block 1302 may optionally, at Block 1306, receive a TBS scaling indication from a network entity. Resource grant receiving component 1210 may receive the TBS scaling indication from the network entity (e.g., from eNB 1204). Thus, for example, the resource grant generated by resource grant generating component 1220 may include an indication of TBS scaling based on an RB size allocated to the UE 1202 in the resource grant. Accordingly, resource grant receiving component 1210 can receive the TBS scaling indication, and TBS determining component 1214 can determine a TBS size for communicating using the ULL resource based at least in part on the TBS scaling indication and/or on bandwidth allocated in the resource grant. Alternatively or additionally, TBS determining component 1214 may determine a TBS scaling factor based on one or more other parameters (e.g., a measured throughput in communicating with the eNB 1204, availability of resources for the uPUSCH transmission, etc.) For example, TBS determining component 1214 may select a larger scaling factor where additional resources are available for the uPUSCH transmission (e.g., where the additional resources achieve one or more threshold numbers of resources). Similarly, a smaller scaling factor may be chosen if fewer resources are available for the uPUSCH transmission (e.g., where the fewer resources are less than one or more threshold numbers of resources). It is to be appreciated that receiving the uplink resource grant at Block 1302 may also include receiving other parameters associated with the resource grant, such as a starting offset, allocated bandwidth, etc., from which the size of one or more RB groups in the uplink resource grant can be determined.

At Block 1308, the UE may determine a TTI for an uplink transmission within a subframe based on the uplink resource grant. In an aspect, the TTI includes at least a symbol, one or more symbols, a slot, etc. In another aspect, the TTI includes one or more symbols which are a subset of a plurality of symbols in the subframe. TTI determining component 1212 can determine the TTI for the uplink transmission within the subframe based on the uplink resource grant received by resource grant receiving component 1210. As described above, with respect to ULL frame structures 800, 900, for example, the TTI can be a symbol duration, multiple symbols duration, slot duration, etc., where an LTE subframe comprises 12 or 14 symbols depending on CP. TTI determining component 1212 can determine the TTI for the uplink transmission based at least in part on a configuration received from the eNB 1204, information in the resource grant received from the eNB 1204 (e.g., an indication of granted resources in a second stage resource grant), and/or the like.

At Block 1310, the UE may transmit communications to the network entity over the resources specified in the uplink resource grant during the TTI. For example, in an aspect, communicating component 661 can transmit communications (e.g., ULL communications 1282) to the network entity (e.g., eNB 1204) over the resources specified in the uplink resource grant during the TTI, where the TTI can be less than a subframe in duration, as described. Transmitting the communications, as described, may include the one or more processors 1203 providing data and/or related signal information to transceiver 1206 for generating signals to transmit over one or more antennas via an RF front end, etc. Due to the shortened TTI, for example, interference may vary across TTIs (e.g., across symbols), and thus it may be desirable to perform interference cancellation at the TTI level for ULL communications (e.g., at the symbol level, two-symbol level, slot level, etc.). In this regard, in one example, transmitting communications, at Block 1310, may optionally, at Block 1312, puncture one or more symbols with one or more configured symbols to facilitate interference cancellation. For example, puncturing may refer to replacing the one or more symbols with the one or more configured symbols once the symbols are generated from data to be transmitted. Communicating component 661 can puncture the one or more symbols with the one or more configured symbols, thereby defining one or more punctured symbols, to facilitate interference cancellation in transmitting the communications to the network entity (e.g., to eNB 1204). The one or more symbols to be punctured can be in known locations, for example, such that the eNB 1204 can observe the one or more configured symbols as punctured in the known locations (e.g., where the known locations can be configured at the UE 1202 and/or eNB 1204).

For example, the punctured symbols can include one or more coded/modulated symbols that are punctured (e.g., replaced) before communicating component 661 (e.g., in a processor corresponding to transceiver 1206) performs a DFT to the symbols to generate a signal for transmission. In addition, for example, the configured symbols can be symbols having a value that is known by the UE 1202 and eNB 1204 (e.g., stored in a configuration at the UE 1202 (and/or eNB 1204), received from the eNB 1204, and/or the like). Thus, then known configured symbols, can accordingly allow the eNB to identify the configured symbols in a transmission from the UE 1202, and can utilize the known value of the configured symbols along with the received transmission to estimate interference over the symbol, subsequent symbols, one or more symbols of the subframe, etc. Puncturing the symbols with known, configured symbols in this regard may preserve the SC-FDM property of the signal to be transmitted from the UE 1202 to eNB 1204. In addition, the punctured symbols may have a modulation order lower than a modulation order corresponding to the uplink resource grant.

Furthermore, as UE 1202 may be operable to communicate using ULL and other RATs (e.g., a legacy wireless communication technology, such as LTE), optionally at Block 1314, the UE may transmit the communications based on other communications related to a second TTI of a subframe duration. In an aspect, the other communications may also be scheduled over the TTI. For example, in an aspect, communicating component 661 can transmit the communications (e.g., ULL communications 1282) based on the other communications (e.g., LTE communications 1282) related to the second TTI of the subframe duration, where the other communications are also scheduled over the TTI (e.g., ULL TTI). As described, transmitting the communications, as described, may include the one or more processors 1203 providing data and/or related signal information to transceiver 1206 for generating signals to transmit over one or more antennas via an RF front end, etc. In other words, the "communications" may be any ULL communications, while the "other communications" may be any communications related to a TTI different from the ULL TTI, such as but not limited to TTIs defined in legacy LTE communications, TTIs associated with other communication in other RATs, etc. Accordingly, in an aspect, communicating component 661 may handle potential conflicts between scheduled concurrent transmission of the communications (e.g., over ULL) and the other communications (e.g., over a legacy wireless communication technology such as LTE) in the same time interval (e.g., subframe or portion thereof).

For example, transmitting the communications based on other communications at Block 1314 may optionally include, at Block 1316, transmitting the communications and the other communications concurrently during the TTI. For example, in an aspect, communicating component 661 may transmit both the communications and other communications concurrently during the TTI. This may include the one or more processors 1203 generating signals for providing to transceiver 1206 for transmission where the signals may include the communications and other communications in similar frequency and/or time resources corresponding to the signals. For example, this can include communicating component 661 transmitting the communications and other communications over respective resources where RBs and/or RB groups assigned to the communications and other communications do not conflict (though the communications and other communications may overlap in the time domain in one or more subframes or portions thereof). In another example, communicating component 661 may concurrently transmit the communications and the other communications where the other communications include control information by including (e.g., piggybacking) the control information from the other communications on the ULL communications (e.g., piggyback control information from PUCCH or PUSCH onto uPUSCH transmission, etc.).

For example, referring to FIGS. 8 and 9, this piggybacking may include communicating component 661 transmitting the control information for the other communications in PUCCH region 802 (and/or PUSCH region 806 depending on the frame structure configured to ULL communications) while communicating the ULL communications in a ULL region (e.g., uPUSCH region 810 and/or uPUCCH region 808). The PUCCH communications may include uplink control indicators (UCI) such as ACK/NACK, scheduling request (SR), CSI, etc. In another example, however, communicating component 661 may transmit the control information for the other communications in region 804.

In another example, transmitting the communications at Block 1314 may optionally, at Block 1318, prioritize the communications over the other communications. Communication prioritizing component 1216 may prioritize the communications (e.g., the ULL communications) over the other communications (e.g., LTE communications) in the TTI. For example, one or more uplink resource grants received from the eNB 1204 may result in communications (e.g., ULL communications) and other communications (e.g., LTE communications) being scheduled in similar resources (e.g., where the TTIs overlap), which is referred to herein as a collision or colliding resources. For example, ULL communications may be scheduled in a symbol TTI where the symbol is within a subframe TTI over which other communications are scheduled. In this regard, prioritizing communications at Block 1318 may include communication prioritizing component 1216 prioritizing the ULL communications for transmission in resources that overlap transmission of the other communications, communication prioritizing component 1216 dropping the other communications over the entire TTI (e.g., the LTE subframe) in prioritizing the ULL communications that may occur in subsequent TTIs in the subframe, etc. This can preserve a single-carrier waveform in signals generated for transmitting the ULL communications, which may be beneficial at least where UE 1202 is link-limited, as the single-carrier signal exhibits low PAPR. In the above examples related to prioritizing the communications over other communications, the communications may relate to uPUCCH communications, uPUSCH communications, uRS communications, etc. in ULL, and/or the other communications may relate to PUCCH communications, PUSCH communications, SRS communications, etc. in LTE.

Where ULL communications are prioritized over PUCCH LTE communications, however, for example, dropping one or more PUCCH symbols may cause non-orthogonality with other PUCCHs of the same RB based on currently defined PUCCH formats in LTE (e.g., formats 1, 1a, 1b, 2a, 2b, 3, etc.) due to time-domain spreading over the RB. Accordingly, for example, prioritizing the ULL communications may include communicating component 661 transmitting the other communications (e.g., PUCCH communications in LTE) using newly defined formats outside of the PUCCH formats currently defined in LTE, where the newly defined formats are not time-domain spread over an RB or otherwise allow for gaps in the time-domain spreading. In another example, communicating component 661 may transmit the other communications in different RBs than those used to transmit the ULL communications based on determining to transmit the ULL communications in RBs that overlap the other communications, etc.

In addition or in the alternative, for example, transmitting the communications based on other communications at 1314 may optionally, at Block 1320, prioritize the other communications over the communications. Communication prioritizing component 1216 can prioritize the other communications (e.g., LTE communications) over the communications (e.g., ULL communications) in some examples. For example, where the other communications correspond to higher layer signaling (e.g., RRC signaling, such as signaling related to the RRC connection with eNB 1204), communication prioritizing component 1216 can prioritize the other communications, such that the ULL communications are not transmitted in the subframe or portion thereof over which the communications and other communications are both initially scheduled (e.g., collide).

In another example, in transmitting communications at Block 1310, it is possible that resources for uPUSCH and uRS communications in ULL collide (e.g., where resource grant receiving component 1210 receives a resource grant with a uRS trigger). In one example, when such a collision exists, communicating component 661 can transmit the uPUSCH instead of the uRS during the TTI. In another example, communicating component 661 may transmit both uPUSCH and uRS concurrently during the TTI. In this case, communicating component 661 can transmit these two channels such that the channels may share a same bandwidth by occupying different resources in the same bandwidth during the TTI.

In another example, it is possible that resources for uPUCCH and uRS communications in ULL collide during the TTI. In one example, when such a collision exists, communicating component 661 can transmit the uPUCCH instead of the uRS during the TTI. In another example, communicating component 661 may transmit both uPUCCH and uRS concurrently during the TTI. In this case, communicating component 661 can transmit these two channels such that the channels may share a same bandwidth by occupying different resources in the same bandwidth during the TTI.

In another example, communicating component 661 may multiplex one or more symbols with a set of modulation symbols to facilitate channel estimation or interference estimation over the TTI, as described above. In one example, the set of modulation symbols may have predetermined values (including zero), which can be known to eNB 1204 or other network entities. In another example, the set of modulation symbols may have a modulation order lower than a modulation order corresponding to the resource grant to facilitate identifying the modulation symbols based on the lower modulation order over the remaining symbols corresponding to the resource grant.

Figure 14:
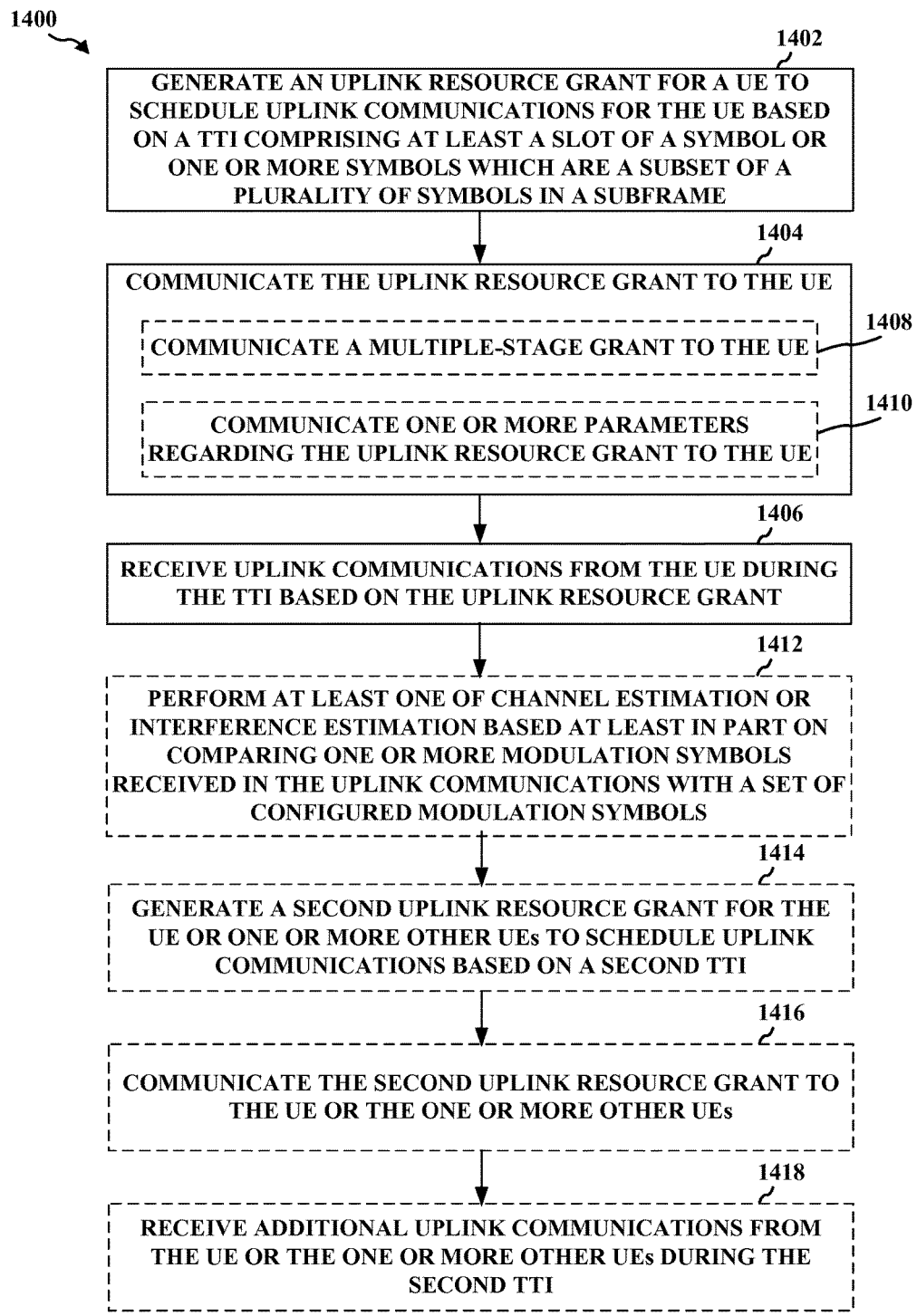
FIG. 14 is a diagram illustrating an example method for generating a ULL resource grant in accordance with aspects described herein.

FIG. 14 illustrates an example method 1400 for scheduling uplink communications (e.g., by an eNB 1204) for one or more UEs based on a TTI having a duration that is less than that of an underlying legacy communication technology (e.g., less than a subframe in LTE). At Block 1402, an eNB may generate an uplink resource grant for a UE to schedule uplink communications for the UE based on a TTI comprising one or more symbols, a slot, etc. which are a subset of a plurality of symbols in a subframe. For example, in an aspect, resource grant generating component 1220 can generate the uplink resource grant for the UE 1202 to schedule uplink communications for the UE 1202 based on the TTI comprising one or more symbols, which are a subset of the plurality of symbols in the subframe, as described. For example, resource grant generating component 1220 can generate the uplink resource grant for ULL communications based on a TTI having a duration of, for instance, one symbol, or two or more symbols, or one slot, etc. In addition, as described, resource grant generating component 1220 can generate the uplink resource grant to include one or more RB groups within a TTI allocated for control or data transmissions on one or more uplink channels. In one example, the ULL resource grant can be defined according to the ULL frame structure(s) 800 (FIG. 8) and/or 900 (FIG. 9), described above. Moreover, as described, resource grant generating component 1220 can generate the uplink resource grant to include a plurality of RB groups that are similar in size based on an amount of a system bandwidth that is available to be granted to the UE 1202 over the TTI.

At Block 1404, the eNB may communicate the uplink resource grant to the UE. For example, in an aspect, scheduling component 602 can communicate the uplink resource grant (e.g., uplink resource grant 1280) to the UE. Communicating, as described, may include the one or more processors 1253 providing data and/or related signal information to transceiver 1256 for generating signals to transmit over one or more antennas via an RF front end, etc. For example, scheduling component 602 may communicate the uplink resource grant over one or more downlink channels in downlink signals (e.g., a PDCCH, or uPDCCH, etc.), as described, such that resource grant receiving component 1210 can obtain the uplink resource grant (e.g., via transceiver 1206), and can communicate over resources indicated in the uplink resource grant (e.g., via transceiver 1206), as described. Thus, at Block 1406, the eNB may receive uplink communications from the UE during the TTI based on the uplink resource grant. Scheduling component 602 can receive the uplink communications (e.g., ULL/LTE communications 1282) from the UE 1202 during the TTI based on the uplink resource grant. Receiving communications, as described, may include the transceiver 1256 receiving one or more signals (e.g., via an RF front end) and providing information regarding the signals to the one or more processors 1253 for decoding, demodulation, or otherwise processing the signals to obtain data therefrom.

In addition, in an example, communicating the uplink resource grant at Block 1404 may optionally, at Block 1408, communicate a multiple-stage grant to the UE. For example, in an aspect, resource grant generating component 1220 can generate the uplink resource grant as a multiple-stage grant, and scheduling component 602 can communicate the multiple-stage grant to the UE 1202. Thus, for example, one or more processors 1253 can generate multiple signals for transmitting the multiple-stage grant, and transceiver 1256 can transmit the multiple signals via an RF front end and one or more antennas. As described, the multiple-stage grant may include a first stage resource grant, which may include a MCS for uplink grants, a TPC for uplink communications from the UE 1202, and/or precoding information, etc., and/or a second stage resource grant, which may include a NDI, a delta MCS, an RS cyclic, an RS triggering, an aperiodic CSI trigger, an indication of the granted resources, etc.

Moreover, in an example, communicating the uplink resource grant at Block 1404 may optionally, at Block 1410, communicate one or more parameters regarding the uplink resource grant to the UE. For example, in an aspect, scheduling component 602 can communicate the one or more parameters regarding the uplink resource grant to the UE 1202. In one example, resource grant generating component 1220 may generate the uplink resource grant to include the one or more parameters. For example, resource grant generating component 1220 may specify a starting offset and/or system bandwidth in the resource grant to indicate a size of the one or more RB groups within a TTI allocated for control or data transmissions on one or more uplink channels. In another example, resource grant generating component 1220 may specify a TBS scaling factor in the uplink resource grant based on the size of the uplink resource grant (e.g., based on the size and/or number of the one or more RB groups). As the bandwidth allocated in the uplink resource grant is configurable, the TBS scaling factor can indicate scaling for the allocated bandwidth to achieve a certain TBS.

Optionally, at Block 1412, the eNB may perform at least one of channel estimation or interference estimation based at least in part on comparing one or more modulation symbols received in the uplink communications with a set of configured modulation symbols. For example, in an aspect, channel/interference estimating component 1222 can perform at least one of channel estimation or interference estimation based at least in part on comparing the one or more modulation symbols received in the uplink communications with the set of configured modulation symbols. As described above, UE 1202 can puncture one or more symbols in the uplink communications with the one or more configured modulation symbols, which can be configured at each of UE 1202 and eNB 1204, configured by eNB 1204 to UE 1202, etc., such that UE 1202 and eNB 1204 know the symbols, location of the symbols, etc. In this regard, for example, channel/interference estimating component 1222 can observe the symbols as received in the known locations for punctured symbols of the uplink communications, and can compare the punctured symbols to the known one or more configured symbols to determine the channel and/or interference associated with the uplink communications. In addition, the punctured symbols may have a modulation order lower than a modulation order corresponding to communications over the resources of the uplink resource grant, as described, to facilitate detection and/or more reliable transmission thereof.

Further, optionally, at Block 1414, the eNB may generate a second uplink resource grant for the UE or one or more other UEs to schedule uplink communications based on a second TTI. For example, in an aspect, resource grant generating component 1220 can generate the second uplink resource grant for the UE 1202 or one or more other UEs to schedule uplink communications based on the second TTI. As described, eNB 1204 may be capable of communicating using ULL communications and some other communications, e.g., an underlying legacy communication technology, such as LTE. Thus, resource grant generating component 1220 may generate the second uplink resource grant for the UE 1202 or one or more other UEs based on a TTI that is a subframe in duration, as in LTE. In this example, the eNB 1204 may support ULL and LTE communications.

In addition, optionally, at Block 1416, the eNB may communicate the second uplink resource grant to the UE or the one or more other UEs, and/or, at Block 1418, the eNB may receive additional uplink communications from the UE or the one or more other UEs during the second TTI. For example, in an aspect, scheduling component 602 may communicate the second uplink resource grant to the UE 1202 or the one or more other UEs in one or more downlink signals 1209 transmitted by transceiver 1206 and/or may receive additional uplink communications in one or more uplink signals 1208 transmitted by the UE 1202, e.g., other communications of an underlying legacy communication technology, such as LTE, from the UE 1202 or the one or more other UEs during the second TTI, which may overlap with the TTI over which the uplink communications are received at Block 1406.

Figure 15:
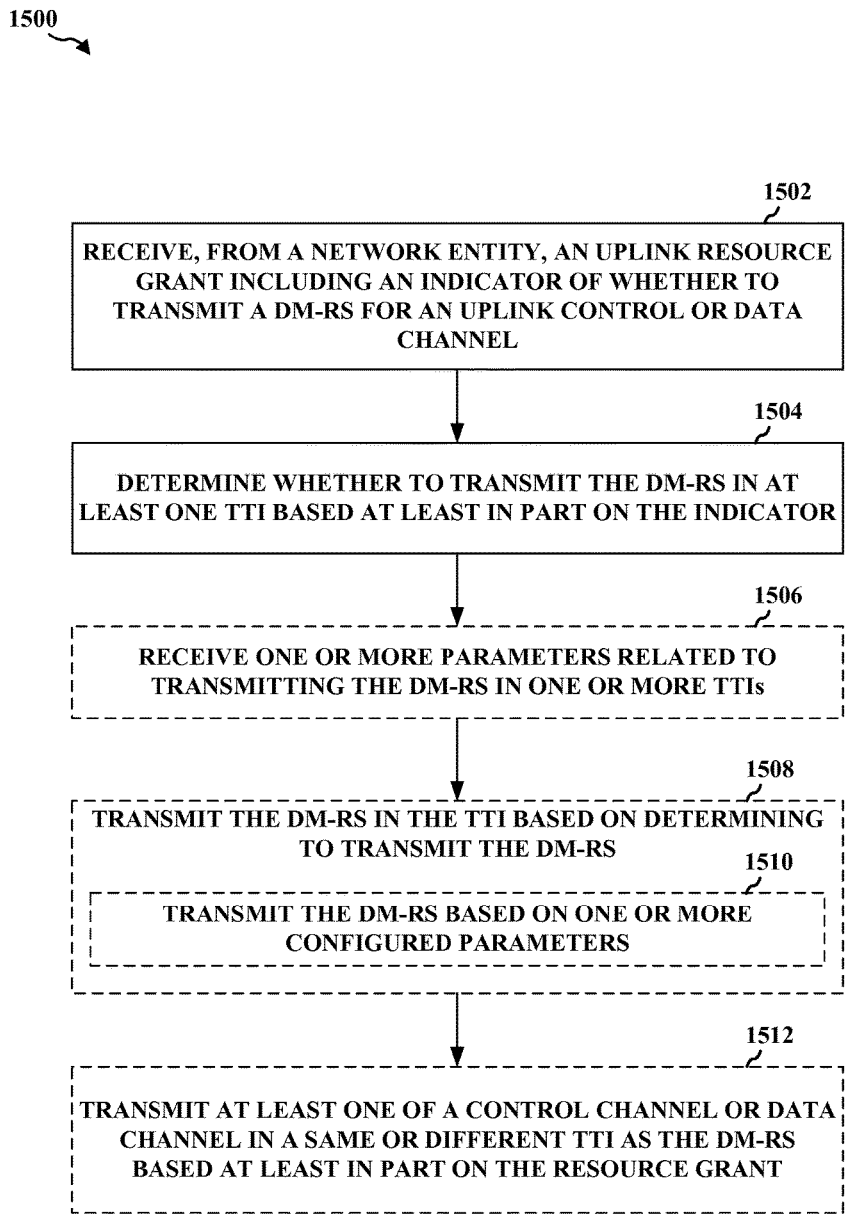
FIG. 15 is a diagram illustrating an example method for transmitting a reference signal in ULL communications in accordance with aspects described herein.

FIG. 15 illustrates an example method 1500 for determining to transmit (e.g., by a UE 1202) a RS based on a received trigger. At Block 1502, the UE may receive, from a network entity, an uplink resource grant including an indicator of whether to transmit a DM-RS for an uplink control or data channel. For example, in an aspect, resource grant receiving component 1210 can receive, from the network entity (e.g., eNB 1204), the uplink resource grant (e.g., uplink resource grant 1280) including the indicator of whether to transmit the DM-RS for an uplink control or data channel. As described, for example, receiving the uplink resource grant and indicator may include receiving the uplink resource grant and indicator in one or more downlink signals 1209 via a transceiver 1206, and processing the signal(s) 1209 by one or more processors 1203 to obtain information specific to the uplink resource grant and/or indicator. For example, the DM-RS can correspond to the uRS described above for ULL communications. In this regard, resource grant generating component 1220 may generate the resource grant for UE 1202 that may include the indicator of whether to transmit the DM-RS, which is generated by RS triggering component 1224, and scheduling component 602 can transmit the resource grant to UE 1202 for receipt by resource grant receiving component 1210 via communicating component 661.

At Block 1504, the UE may determine whether to transmit the DM-RS in at least one TTI based at least in part on the indicator. RS trigger receiving component 1218 can determine whether to transmit the DM-RS in at least one TTI based at least in part on the indicator. For example, if the indicator is received, RS trigger receiving component 1218 can determine to transmit the DM-RS (e.g., the uRS) in at least one TTI. Furthermore, RS trigger receiving component 1218 may determine the TTI within which to transmit the DM-RS based on the RS trigger, which may be received in a multiple-stage grant, as described above. For example, the resource grant may include an explicit indication of a TTI (e.g., a TTI index within a subframe or other identifier), an implicit indication of a TTI (e.g., an indication of number of TTIs following the TTI over which the resource grant is received), etc., to use for transmitting the DM-RS.

Optionally, at Block 1506, the UE may receive one or more parameters related to transmitting the DM-RS in one or more TTIs. For example, in an aspect, RS trigger receiving component 1218 may receive the one or more parameters related to transmitting the DM-RS in the one or more TTIs. For example, RS triggering component 1224 can signal, e.g., transmit in one or more downlink signals 1209 via transceiver 1256, the one or more parameters to the UE 1202, such as in an RRC or other configuration. In another example, RS triggering component 1224 can signal the one or more parameters to the UE 1202 in the multiple-stage resource grant, and/or the like. In any case, RS trigger receiving component 1218 can determine the one or more parameters based on receiving the configuration, in one example. The one or more parameters for transmitting the DM-RS may include one or more periodicity parameters for periodic transmission of the DM-RS, a bandwidth for transmitting the DM-RS, one or more frequency locations over which to transmit the DM-RS in configured TTIs (e.g., symbols), a hopping pattern to use in transmitting the DM-RS in different frequency locations over a number of configured TTIs, a number of antenna ports to use in transmitting the DM-RS, a comb level (e.g., as defined for legacy SRS symbol) to use in transmitting the DM-RS, etc. In another example, RS trigger receiving component 1218 can determine the one or more parameters based on similar parameters received for uPUCCH and/or uPUSCH transmissions.

For periodic uRS transmissions, for example, at least a subset of the one or more parameters can be related to a periodic RS trigger, such as a periodicity (e.g., an indication of units of TTIs, milliseconds (ms), or other parameter indicating TTIs over which uRS is to be periodically transmitted). The one or more parameters may also define a periodicity such that uRS is transmitted in a certain set of TTIs in a subframe (e.g., every N subframes, where N can be a positive integer). In another example, the one or more parameters may include an indication of bandwidth over which the uRS is to be transmitted (e.g., a number of resource blocks). In one example, the indication of bandwidth may include an integer multiple of 4 resource blocks. In another example, the one or more parameters may relate to defining hopping pattern for the uRS, where resources utilized to transmit the uRS can hop from one frequency location in one TTI to another frequency location in another TTI (e.g., based on the parameter or otherwise). Thus, for example, the one or more parameters may include an indication of the frequency locations that define the pattern, or an indication of spacing between frequency resources between one or more TTIs, etc. Moreover, for example, the one or more parameters may include an indication of a number of antenna ports to utilize in transmitting the uRS. For example, where the uRS relates to uPUCCH transmissions (and is transmitted in the uPUCCH region 808 as shown in FIG. 11, for example), the number of antenna ports can be fixed at one. Where the uRS relates to uPUSCH transmission (and is transmitted in the uPUSCH region 810 as shown in FIG. 11), the number of antenna ports can be one, two, four, etc., in connection with possible UL MIMO operations on uPUSCH. Moreover, each antenna port may be non-precoded and/or may be similar to a 1-port SRS. Additionally, the one or more parameters may assign different cyclic shifts or comb offsets for each antenna port. For example, periodic uRS can be used for uPUCCH and/or uPUSCH demodulation when aperiodic uRS is not available, or in combination with aperiodic uRS when it is available. Periodic uRS may also be used to assist in uplink subband based scheduling especially when uRS is enabled with frequency hopping in different transmissions. Periodic uRS can also provide a "keep-alive" UL operation in terms of uplink power control, uplink time/frequency tracking, etc.

For aperiodic uRS, an aperiodic RS trigger can be defined as relating to either a TTI based on a timing relationship (e.g., 3 TTIs after the trigger), and/or additionally based on a periodicity. (e.g., an indication of units of TTIs, milliseconds (ms), or other parameter indicating TTIs over which uRS is to be periodically transmitted). The one or more parameters may also define a periodicity such that uRS is possibly transmitted in a certain set of symbols in a subframe (e.g., every N subframes, where N can be a positive integer). As an example, if the one or more parameters relate to transmitting aperiodic uRS triggered in symbol n, where n can be a positive integer, if symbol n+3 is not configured as a symbol for aperiodic uRS transmission but symbol n+4 is configured as a symbol for aperiodic uRS transmission, communicating component 661 can transmit the aperiodic uRS in symbol n+4 instead. As described with respect to periodic uRS, the one or more parameters may include a bandwidth over which the uRS is to be transmitted. Aperiodic uRS, once triggered, may be transmitted just once (one-shot transmission) or multiple times (multi-shot transmission). In case of multi-shot aperiodic uRS, hopping can be enabled (e.g., and associated hopping pattern parameter (s) configured), such that uRS can hop from one frequency location in one transmission to another frequency location in another transmission. Aperiodic uRS may also be configured with a number of antenna ports, as similarly described with respect the periodic uRS (e.g., such that aperiodic uRS for uPUCCH can use one antenna port and/or uRS for uPUSCH can use 1, 2, 4, etc. antenna ports). As described above, in this example, each antenna port may be non-precoded and/or may be similar to a 1-port SRS. Additionally, the one or more parameters may assign different cyclic shifts or comb offsets for each antenna port. Aperiodic uRS can be used for uPUCCH and/or uPUSCH demodulation by itself, or in combination with periodic uRS when it is available. When there is an accompanying uPUCCH or uPUSCH, uRS parameters can be consistent or be based on uPUCCH or uPUSCH parameters. For example, uRS may have the same bandwidth, frequency location, and the number of antenna ports as the corresponding uPUSCH. When there is no accompanying uPUCCH or uPUSCH, uRS parameters can be based on some dynamic indication in an uplink resource grant, for example.

In either case, optionally, at Block 1508, the UE may transmit the DM-RS in the TTI based on determining to transmit the DM-RS. For example, in an aspect, communicating component 661 may transmit the DM-RS (e.g., as ULL/LTE communication 1282) in the TTI based on RS trigger receiving component 1218 determining to transmit the DM-RS in the TTI. Thus, transmitting the DM-RS in the TTI may optionally include, at Block 1510, transmitting the DM-RS based on one or more configured parameters. The one or more configured parameters can correspond to the one or more parameters received or determined by RS trigger receiving component 1218, as described above, for transmitting a periodic and/or aperiodic DM-RS (e.g., uRS) in one or more TTIs. Transmitting the RS, as described, may include communicating component 661 transmitting the DM-RS in the one or more TTIs where one or more processors 1203 can generate the corresponding signal for transmission by transceiver 1206 over one or more antennas via an RF front end (e.g., using the specified frequency location, which may be based on a hopping pattern, using the specified number of antenna ports or comb level, and/or the like). In one example, as shown in timelines 1000, 1010 above, the DM-RS (e.g., uRS) transmitted by communicating component 661 may occupy one symbol. In addition, for example, each DM-RS may have configurable bandwidth, a configurable hopping pattern, such that the DM-RS can hop across subbands, different comb offsets, etc. (e.g., which can be determined by eNB 1204 and controlled via RS triggering component 1224 specifying one or more parameters to the UE 1202). Moreover, each DM-RS may have one or more ports that are non-precoded and/or can be indicated via cyclic shifts representative of the one or more ports. The cyclic shifting can be configured by RS triggering component 1224 and specified to UE 1202 (e.g., as part of the resource grant or otherwise).

In an example, communicating component 661 can transmit an aperiodic uRS that is triggered by receiving the uplink resource grant (e.g., in a downlink control indicator (DCI)) based on the one or more parameters received from the eNB 1204. For example, communicating component 661 can transmit the uRS such that the timing is different from the corresponding uPUSCH (e.g., transmit the uRS 3 TTIs after the uplink grant is received where the uPUSCH is transmitted 4 TTIs after the uplink grant, as shown in timeline 1010 of FIG. 10). In another example, communicating component 661 can transmit a periodic uRS that is triggered based on the one or more parameters that may identify explicit TTIs for transmitting the uRS (e.g., after 6 TTIs then 9 TTIs, as shown in timeline 1000 of FIG. 10). In addition, in an example, communicating component 661 may transmit a uRS for each of control and data communications in frequency locations associated with control and data communications, respectively, as shown in FIG. 11 (e.g., uPUCCH uRS in uPUCCH region 808, and uPUSCH uRS in uPUSCH region 810).

Optionally, at Block 1512, the UE may transmit at least one of a control channel or data channel in a same or different TTI as the DM-RS based at least in part on the resource grant. For example, in an aspect, communicating component 661 can transmit at least one of a control channel or data channel in the same or different TTI as the DM-RS based at least in part on the resource grant (e.g., received from eNB 1204). As similarly described above in FIG. 13, the control or data channel may correspond to PUCCH, PUSCH, SRS, etc. in LTE, and transmission of the DM-RS may be prioritized where parallel transmission is not allowed; thus, in this example, transmitting at least one control channel or data channel at Block 1512 can include transmitting the at least one control channel or data channel in a different TTI as the DM-RS. In another example, the control or data channel may correspond to uPUCCH or uPUSCH, and the uRS may be transmitted in conjunction therewith or not; thus, in this example, transmitting at least one control channel or data channel at Block 1512 can include transmitting the at least one control channel or data channel in the same or different TTI as the uRS, etc., as described above.

For example, where the uRS collides with PUSCH transmission in LTE, the uRS can be prioritized over the PUSCH transmission by the UE 1202 such that in colliding symbols where the uRS and PUSCH are transmitted, communicating component 661 can drop PUSCH transmission in the colliding symbols, and/or may drop the entire TTI for PUSCH. Similarly, communicating component 661 may drop SRS transmission in symbols that collide with uRS transmission. In addition, as described above with respect to collision between ULL communications and PUCCH in LTE, uRS may generally be prioritized over PUCCH such that communicating component 661 can drop PUCCH transmission in the colliding symbols, and/or may drop the entire TTI for PUCCH, but in some cases may prioritize PUCCH such that uRS transmissions in colliding symbols are dropped (e.g., where the PUCCH communications correspond to RRC layer communications). Additionally, as described above with respect to colliding ULL and PUCCH communications, additional PUCCH formats may be defined to allow communicating component 661 to place the PUCCHs in different RBs where dropping one or more symbols of the PUCCH may cause non-orthogonality with other PUCCHs based on the currently defined PUCCH formats.

Figure 16:
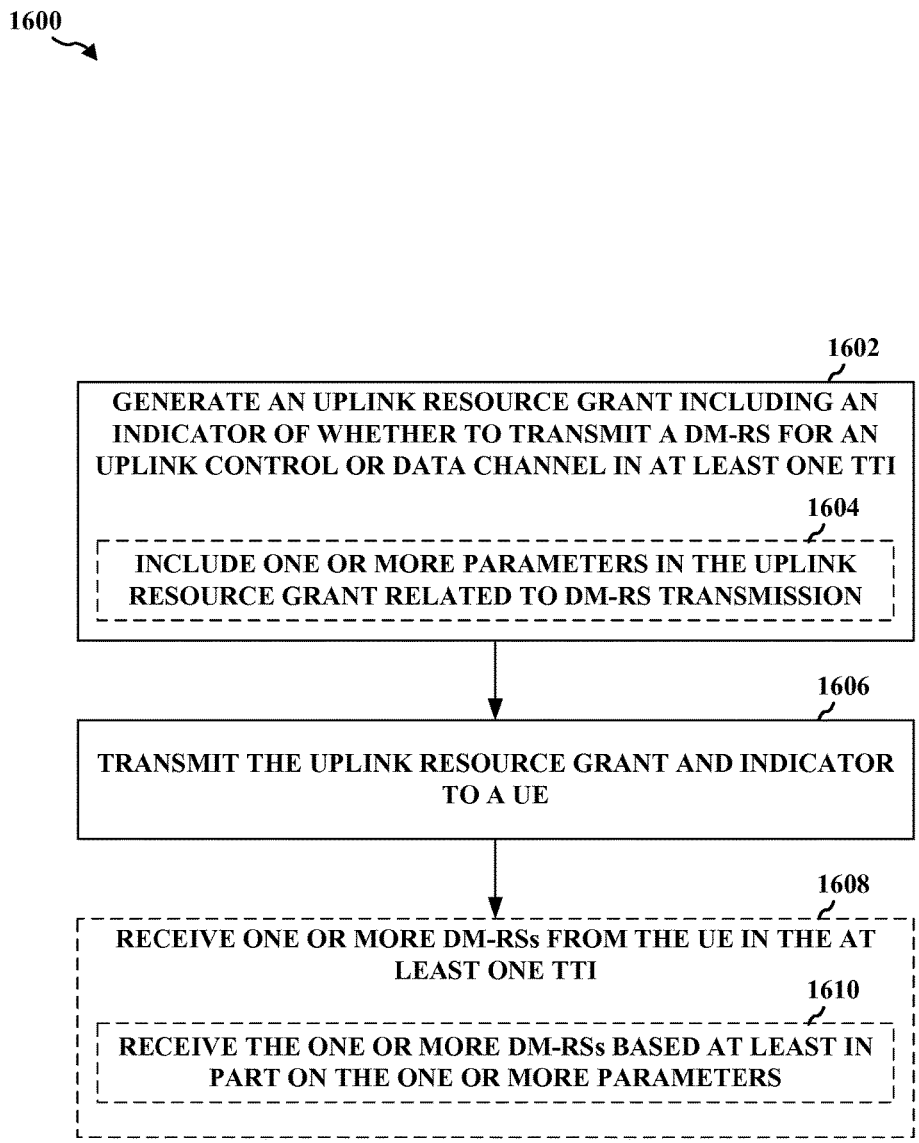
FIG. 16 is a diagram illustrating an example method for receiving a reference signal in ULL communications in accordance with aspects described herein.

FIG. 16 illustrates an example method 1600 for communicating an indicator (e.g., by an eNB 1204) of whether to transmit a DM-RS to a UE (e.g., UE 1202). At Block 1602, the eNB may generate an uplink resource grant including an indicator of whether to transmit a DM-RS for an uplink control or data channel in at least one TTI. Resource grant generating component 1220 can generate the uplink resource grant including the indicator of whether to transmit the DM-RS for the uplink control or data channel in at least one TTI. For example, RS triggering component 1224 may indicate a trigger for transmitting the DM-RS (e.g., uRS) to the resource grant generating component 1220 to facilitate generating the resource grant with the trigger for transmitting DM-RS. Generating the uplink resource grant including the indicator at Block 1602 may include, at Block 1604, one or more parameters in the uplink resource grant related to the DM-RS transmission. Resource grant generating component 1220 can include the one or more parameters in the uplink resource grant where the parameter(s) are related to the DM-RS transmission. As described, the one or more parameters may be related to transmitting a periodic or aperiodic DM-RS and may include one or more of an explicit or implicit indication of a TTI during which to transmit the DM-RS, a cyclic shift, a bandwidth, a hopping pattern, one or more frequency locations, one or more antenna ports, one or more comb levels, etc. for the UE 1202 to utilize in transmitting the DM-RS.

At Block 1606, the eNB may transmit the uplink resource grant and indicator to a UE. Scheduling component 602 can transmit the uplink resource grant (e.g., uplink resource grant 1280) and indicator to the UE. For example, scheduling component 602 can communicate the uplink resource grant to the UE 1202 in RRC signaling, in a multiple-stage grant (e.g., as the RS trigger in the second stage, as described above), and/or the like. As described, scheduling component 602 can transmit the uplink resource grant and indicator based on providing data related to the grant and indicator to one or more processors 1253 for generating signal information and providing the signal information to transceiver 1256 generating and transmitting one or more signals indicating the grant and/or indicator via one or more antennas via an RF front end. Resource grant receiving component 1210 and/or RS trigger receiving component 1218 can receive the uplink resource grant and/or the indicator, as described. The uplink resource grant may correspond to granting resources based on a ULL TTI for transmitting uplink control and/or data and for transmitting uRS, as described.

Optionally, at Block 1608, the eNB may receive one or more DM-RSs from the UE in the at least one TTI. Scheduling component 602 can receive the one or more DM-RSs from the UE 1202 in the at least one TTI. In an example, scheduling component 602 can accordingly use the DM-RS in demodulating communications received over the corresponding resources of the uplink resource grant. Receiving the one or more DM-RSs at Block 1608 may include, at Block 1610, receiving the one or more DM-RSs (e.g., as ULL/LTE communication 1282) based at least in part on the one or more parameters. Thus, as described, the parameters may explicitly or implicitly indicate the at least one TTI over which the DM-RS is to be transmitted by the UE 1202, and scheduling component 602 may receive the DM-RS in the at least one TTI. Similarly, scheduling component 602 may receive the DM-RS over the bandwidth, according to the hopping pattern or frequency locations, via the number antenna ports, according to the comb level, etc. specified in the one or more parameters. In one example, scheduling component 602 may receive separate uRSs for control and data communications, where the uRSs may each be received in frequency resources related to the control and data communications, respectively, as shown in FIG. 11.

Figure 17:
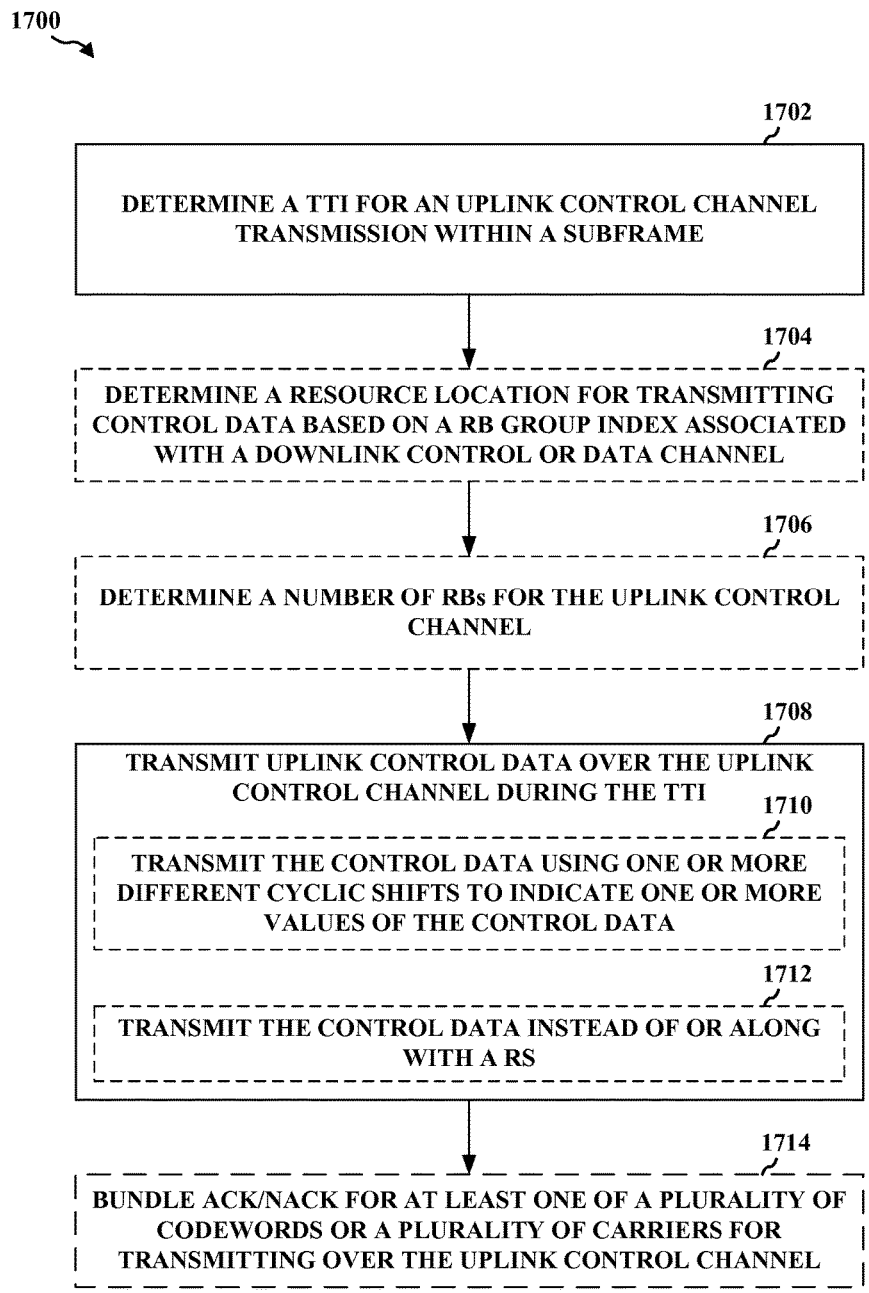
FIG. 17 is a diagram illustrating an example method for transmitting control data in ULL communications in accordance with aspects described herein.

FIG. 17 illustrates an example method 1700 for transmitting uplink control data (e.g., by a UE 1202) in ULL. At Block 1702, a UE may determine a TTI for an uplink control channel transmission within a subframe. In an aspect, the TTI includes a symbol, a number of symbols, a slot, etc. which are a subset of a plurality of symbols in the subframe. TTI determining component 1212 can determine the TTI for an uplink control channel transmission within the subframe. This can be based on a resource grant received by resource grant receiving component 1210 from eNB 1204 (e.g., uplink resource grant 1280), which may indicate the TTI duration, the type of communication technology (e.g., ULL), etc. as described, in one example. Moreover, for example, the TTI can be of a symbol duration, multiple symbols duration, slot duration, etc., as described.

Optionally, at Block 1704, the UE may determine a resource location for transmitting control data based on a RB group index associated a downlink control or data channel. Communicating component 661 may determine the resource location for transmitting control data based on the RB group index associated with the downlink control or data channel. For example, communicating component 661 may receive downlink control and/or data channel communications from eNB 1204, as described, and may determine the resource location for transmitting control data for the downlink control and/or data channel based on the received communications. For example, communicating component 661 may determine the resource location to be the same as the RB group index over which the downlink control and/or data channel is/are received but in a subsequent TTI, a resource location that is an offset from the RB group index (e.g., where the offset can be received in the resource grant by resource grant receiving component 1210), etc.

Optionally, at Block 1706, the UE may determine a number of RBs for the uplink control channel. Communicating component 661 can determine the number of RBs for the uplink control channel. For example, communicating component 661 can determine the number of RBs for the uplink control channel based at least in part on the uplink resource grant received from the eNB 1204 (e.g., based on an indication of resource s allocated by the resource grant). In another example, communicating component 661 can determine the number of RBs for the uplink control channel based at least in part on determining a payload size of the control data to be transmitted (e.g., determining a size in bytes of the payload, an MCS and/or an achievable throughput that may be related to the MCS, etc.).

At Block 1708, the UE may transmit uplink control data over the uplink control channel during the TTI. Communicating component 661 can transmit the uplink control data (e.g., as ULL/LTE communication 1282) over the uplink control channel during the TTI. As described, the uplink control channel may be transmitted according to a received resource grant that indicates uplink control channel resources over the TTI including one or more RB or RB groups within the TTI. Communicating component 661 can schedule and transmit the control data additionally based on determined resource locations (e.g., based on RB group index of related downlink control or data channels), the determined number of RBs, and/or the like. The control data can include ACK/NACK feedback for data received in a downlink channel in a prior TTI, SR, etc., and communicating component 661 may additional use different signaling for the transmission. As described, transmitting the uplink control data may include the one or more processors 1203 providing data and/or related signal information to transceiver 1206 for generating signals to transmit over one or more antennas via an RF front end, etc.

For example, where the uplink control data relates to SR to be transmitted in the uplink control channel, resource grant generating component 1220 may generate an associated resource grant for UE 1202 that specifies RRC configured resources (e.g., RBs and/or cyclic shifts) for transmitting SR in ULL. Resource grant receiving component 1210 may receive the resource grant, and communicating component 661 can accordingly transmit SR to eNB 1204 based on the configured resources (e.g., using the RBs and/or corresponding cyclic shifts). In an example, RBs indicated by resource grant generating component 1220 may include an explicit indication of RBs, a number of RBs which are to start with an RB corresponding to or offset from an RB group index of the corresponding control or data channel, etc.

In another example, the UE, at Block 1708, may optionally, at Block 1710, transmit the control data using one or more different cyclic shifts to indicate one or more values of the control data. Communicating component 661 can transmit the control data using the one or more cyclic shifts to indicate the one or more values of the control data. For example, where only ACK/NACK is to be transmitted in the uplink control channel, resource grant generating component 1220 may generate a resource grant for UE 1202 for transmitting over PUCCH. Resource grant receiving component 1210 may receive the resource grant, and communicating component 661 can accordingly transmit ACK/NACK to eNB 1204 over PUCCH based at least in part on a block index of the corresponding uPDCCH data received from eNB 1204. Resource grant generating component 1220 may specify different cyclic shifts for ACK and NACK, which communicating component 661 can utilize in transmitting ACK and NACK. For example, cyclic shift 0 may be used for ACK while cyclic shift 6 may be used for NACK. In addition, in an example, resource grant generating component 1220 may specify different cyclic shifts for combined transmission of SR and ACK or NACK (e.g., in the resource grant), which communicating component 661 can utilize in transmitting SR with ACK or NACK. For example, cyclic shift 2 may be used for ACK and a positive SR, while cyclic shift 8 may be used for NACK and a positive SR.

Moreover, at Block 1708, the UE may also optionally, at Block 1712, transmit the control data instead of or along with a RS. Communicating component 661 can transmit the control data instead of or along with the RS. For example, the resource grant may include a RS trigger (e.g., for determining when to transmit a uRS). Where transmission of the uRS collides with transmission of the control data, communicating component 661 can determine whether to transmit the control data instead of or along with the uRS, as described previously. For example, where the uRS collides with transmission of the uplink control channel uPUCCH, communicating component 661 can transmit uPUCCH and drop uRS, transmit uRS and drop uPUCCH (e.g., where transmitting the uplink control data at Block 1708 is optional), or can transmit both. To transmit both, for example, communicating component 661 may transmit uPUCCH if it is SR or ACK/NACK by transmitting uRS with different cyclic shift(s) to indicate the SR or ACK/NACK. If both SR and ACK/NACK are scheduled along with uRS, SR may be dropped in this instance.

Additionally, in an example, and at Block 1714, the UE may bundle ACK/NACK for at least one of a plurality of codewords or a plurality of carriers for transmitting over the uplink control channel. Communicating component 661 can bundle the ACK/NACK for at least one of the plurality of codewords, which may be over a plurality of carriers (e.g., in MIMO communications or carrier aggregation) for transmitting over the uplink control channel. For example, bundling ACK/NACK can include specifying a single ACK/NACK value for the plurality of codewords or carriers (e.g., ACK if all values are ACK, and NACK if at least one value is NACK, etc.). Bundling can also include spatial bundling of the ACK/NACK values.

In another example, transmitting the uplink control data at Block 1708 may include transmitting the uplink control data as two or more ACK/NACK bits for each of two or more codewords and/or one or more carriers. In addition, in an example, spatial bundling within a carrier can be enabled such that N ACK/NACK bits can be generated for N carriers, where N is an integer. Corresponding, uPUCCH can be designed to accommodate two or more ACK/NACKs by utilizing more resource blocks and/or more possible cyclic shifts within a resource block to indicate multiple ACK/NACK values. If two or more resource blocks are used for transmitting the uplink control data at Block 1708, the cyclic shift utilized one RB can be the same or different that of another RB.

In one example, transmitting the uplink control data at Block 1708 may not include transmitting a periodic CSI report. In such a case, communicating component 661 may report the periodic CSI based on the 1-ms TTI (e.g., using PUCCH in LTE instead). Thus, for example, transmitting uplink control data at Block 1708 may include transmitting the uPUCCH though the UE 1202 may additionally be triggered or configured to transmit PUCCH either simultaneously or in a different TTI.

In another example, in addition to 1-symbol uPUCCH, uPUCCH may occupy two or more symbols. Thus, for example, TTI determining component 1212 can determine different TTIs (e.g., symbols) for transmitting the control data. Moreover, communicating component 661 may determine different resource blocks in the different TTIs for transmitting the control data such that frequency diversity gain can be achieved. As one example, communicating component 661 can determine the different RBs to use in two TTIs (e.g., 2 symbols) such that a 2-symbol uPUCCH transmission may be transmitted using mirror hopping in frequency (e.g., if a RB index n is used in a symbol, a RB index N−n can be used in a second symbol, where N is a total number of RBs, e.g., equal to uplink bandwidth in number of RBs). For example, communicating component 661 can transmit the 2-symbol uPUCCH in response to a 2-symbol downlink transmission received by communicating component 661 and/or a downlink transmission of a different time duration (e.g., 1 symbol).

Figure 18:
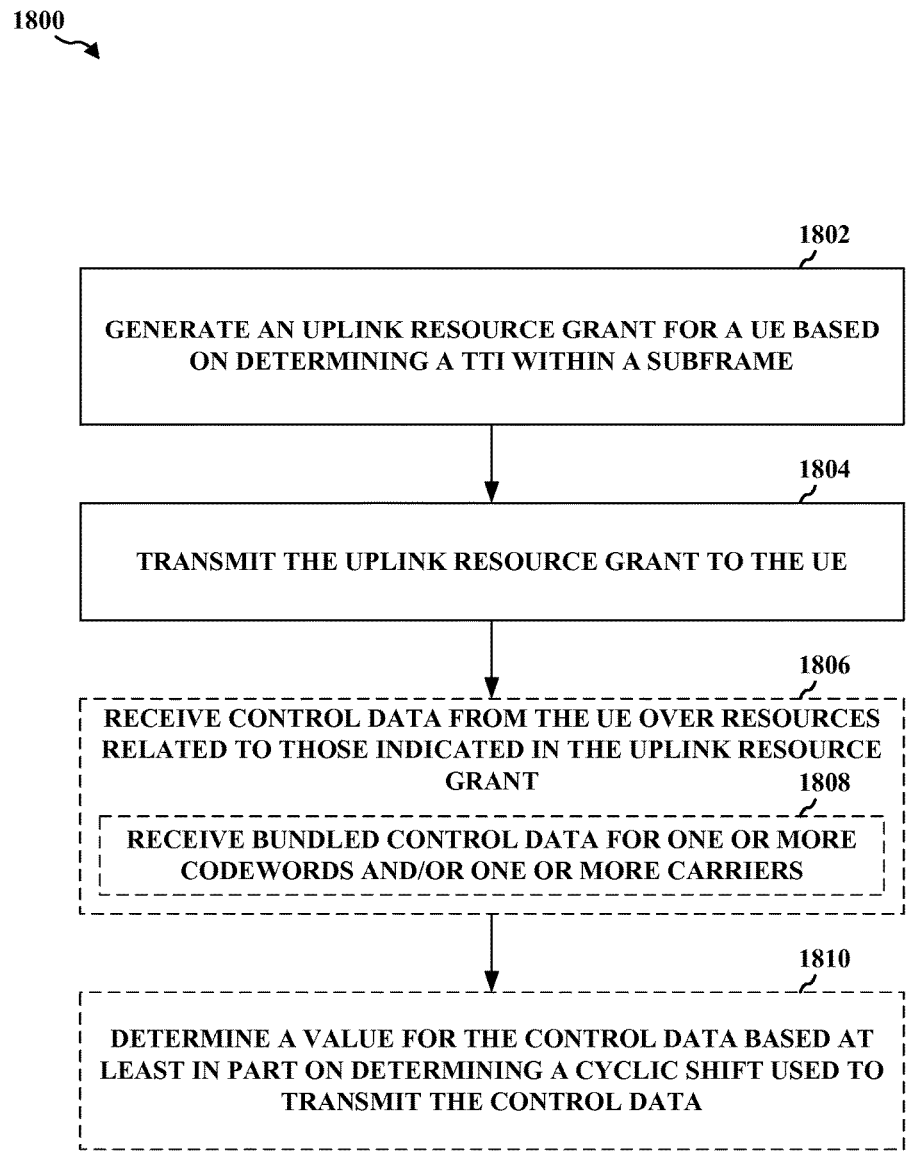
FIG. 18 is a diagram illustrating an example method for receiving control data in ULL communications in accordance with aspects described herein.

FIG. 18 illustrates an example method 1800 for transmitting (by an eNB 1204) uplink resource grants to a UE for receiving uplink control data in ULL. At Block 1802, the eNB may generate an uplink resource grant for a UE based on determining a TTI within a subframe. In an aspect, the TTI includes a symbol, a number of symbols, a slot, etc., which are a subset of a plurality of symbols in the subframe. Resource grant generating component 1220 can generate the uplink resource grant for the UE (e.g., UE 1202) based on determining the TTI within the subframe. For example, the TTI can include a number of symbols which are a subset of a plurality of symbols in the subframe, and the resource grant may be generated to indicate the TTI duration, the type of communication technology (e.g., ULL), etc., in one example. Moreover, for example, the TTI can be of a symbol duration, multiple symbols duration, slot duration, etc., as described.

At Block 1804, the eNB may transmit the uplink resource grant to the UE. Scheduling component 602 can transmit the uplink resource grant (e.g., uplink resource grant 1280) to the UE (e.g., UE 1202). As described, for example, scheduling component 602 can transmit the uplink resource grant to the UE over a downlink control channel in ULL (e.g., using a symbol or other duration of TTI that is less than a subframe). Moreover, the uplink resource grant may indicate one or more aspects regarding uplink resources, such as an RB group index for an uplink control and/or data channel, and/or other parameters, which can be used to determine an RB group index for transmitting control data, as described above. Transmitting the uplink resource grant, as described, may include the one or more processors 1253 providing data and/or related signal information to transceiver 1256 for generating signals to transmit over one or more antennas via an RF front end, etc.

Optionally include, at Block 1806, the eNB may receive control data from the UE over resources related to those indicated in the uplink resource grant. Scheduling component 602 can receive the control data (e.g., as ULL/LTE communication 1282) from the UE (e.g., UE 1202) over the resources related to those indicated in the uplink resource grant. For example, scheduling component 602 can receive control data from the UE 1202 over resources in a TTI that is an offset number of TTIs from a TTI indicated in the uplink resource grant. Moreover, the eNB reception, at Block 1806, of the control data may optionally include, at Block 1808, bundled control data for one or more codewords and/or one or more carriers over the resources. Scheduling component 602 can receive the bundled control data for the one or more codewords and/or one or more carriers over the resources. As described, this may include receiving a single ACK/NACK indicator for the codewords and/or carriers (e.g., NACK where at least one codeword or carrier indicates NACK, and ACK otherwise). Scheduling component 602 may accordingly retransmit the one or more codewords over the one or more carriers based on the bundled feedback.

Optionally include, at Block 1810, the eNB may determine a value for the control data based at least in part on determining a cyclic shift used to transmit the control data. Scheduling component 602 may determine the value for the control data based at least in part on determining the cyclic shift used to transmit the control data. For example, where scheduling component 602 observes ACK/NACK signaling using a cyclic shift of 0, this may indicate ACK, where a cyclic shift of 6 may indicate NACK. Similarly, where the control data includes SR and ACK/NACK, different cyclic shifting may be used, as described. In any case, scheduling component 602 may determine control data values based at least in part on the cyclic shifting.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for communicating in a wireless network, comprising:
    receiving an uplink resource grant from a network entity for communicating in the wireless network;
    determining a transmission time interval (TTI) for an uplink transmission within a subframe based on the uplink resource grant, wherein the TTI is a first TTI comprising one or more symbols which are a subset of a plurality of symbols in the subframe;
    receiving a second uplink resource grant from the network entity for communicating in the wireless network;
    determining a second TTI for a second uplink transmission based on the second uplink resource grant, wherein the second TTI comprises the subframe; and
    transmitting communications to the network entity over resources specified in the uplink resource grant during the TTI, wherein transmitting the communications comprises prioritizing transmission of communications over the resources specified in the uplink resource grant related to the first TTI over transmission of communications over the resources specified in the second uplink resource grant.

2. The method of claim 1, wherein a duration of the TTI comprises at least one of a symbol duration, a two-symbol duration, or a slot duration wherein the subframe comprises two slots.

3. The method of claim 1, wherein each of the one or more symbols in the TTI is based on one of an orthogonal frequency division multiplexing (OFDM) symbol or a single-carrier frequency-division-multiplexing (SC-FDM) symbol.

4. The method of claim 1, wherein the uplink resource grant allocates one or more resource block (RB) groups within at least a portion of the one or more symbols for control or data transmissions on one or more uplink channels, and wherein each of the one or more RB groups comprises a plurality of RBs.

5. The method of claim 4, wherein the uplink resource grant allocates at least two RB groups, and wherein the at least two RB groups are contiguous in frequency.

6. The method of claim 4, wherein the one or more RB groups comprises two or more RB groups each having a substantially equal number of RBs.

7. The method of claim 4, wherein each of the one or more RB groups comprises a number of RBs, wherein the number is an integer multiple of two, three, or five.

8. The method of claim 4, further comprising determining a size of the one or more RB groups based on at least one of a configured starting offset or a system bandwidth of the uplink resource grant.

9. The method of claim 4, further comprising determining a size of the one or more RB groups based on a symbol type, wherein the symbol type comprises of a first type configurable for sounding reference signal (SRS) transmission, or a second type not configurable for SRS transmission.

10. The method of claim 1, wherein receiving the uplink resource grant is part of a multiple-stage resource grant, wherein a first stage grant includes at least one of a modulation and coding scheme (MCS), a transmit power control, or precoding information, and a second stage grant includes at least one of a new data indicator, a hybrid automatic repeat/request (HARQ) process identity, a delta MCS, a demodulation reference signal cyclic shift, a ULL reference signal triggering indicator, an aperiodic channel state information triggering indicator, or an indication of allocated resources in the uplink resource grant, or any combination thereof.

11. The method of claim 1, further comprising determining a transport block size (TBS) scaling factor, wherein transmitting the communications is based at least in part on a TBS computed based on the TBS scaling factor.

12. The method of claim 1, further comprising transmitting other communications to the network entity over the resources specified in the second uplink resource grant during the second TTI in parallel with the communications over the resources specified in the uplink resource grant related to the first TTI.

13. The method of claim 1, wherein prioritizing comprises dropping transmission of communications over the resources specified in the second uplink resource grant during the TTI or the second TTI.

14. The method of claim 1, wherein the second uplink resource grant corresponds to one of a physical uplink control channel, a physical uplink shared channel, or a sounding reference signal in long term evolution.

15. The method of claim 1, further comprising puncturing one or more modulation symbols with a set of modulation symbols corresponding to the uplink resource grant to facilitate at least one of channel estimation or interference estimation over the TTI.

16. The method of claim 15, wherein the one or more modulation symbols have one or more determined values.

17. The method of claim 15, wherein the one or more modulation symbols have a modulation order lower than the modulation order corresponding to the uplink resource grant.

18. A user equipment for communicating in a wireless network, comprising:
a transceiver;
at least one processor communicatively coupled with the transceiver via a bus for communicating in the wireless network; and
a memory communicatively coupled with the at least one processor and/or the transceiver via the bus;
wherein the at least one processor and the memory are operable to:
receive, via the transceiver, an uplink resource grant from a network entity for communicating in the wireless network;
determine a transmission time interval (TTI) for an uplink transmission within a subframe based on the uplink resource grant, wherein the TTI is a first TTI comprising one or more symbols which are a subset of a plurality of symbols in the subframe;
receive a second uplink resource grant from the network entity for communicating in the wireless network;
determine a second TTI for a second uplink transmission based on the second uplink resource grant, wherein the second TTI comprises the subframe; and
transmit, via the transceiver, communications to the network entity over resources specified in the uplink resource grant during the TTI, wherein the at least one processor and the memory are operable to transmit the communications at least in part by prioritizing transmission of communications over the resources specified in the uplink resource grant related to the first TTI over transmission of communications over the resources specified in the second uplink resource grant.

19. The user equipment of claim 18, wherein a duration of the TTI comprises at least one of a symbol duration, a two-symbol duration, or a slot duration wherein the subframe comprises two slots.

20. The user equipment of claim 18, wherein each of the one or more symbols in the TTI is based on one of an orthogonal frequency division multiplexing (OFDM) symbol or a single-carrier frequency-division-multiplexing (SC-FDM) symbol.

21. The user equipment of claim 18, wherein the uplink resource grant allocates one or more resource block (RB) groups within at least a portion of the one or more symbols for control or data transmissions on one or more uplink channels, and wherein each of the one or more RB groups comprises a plurality of RBs.

22. The user equipment of claim 21, wherein the uplink resource grant allocates at least two RB groups, and wherein the at least two RB groups are contiguous in frequency.

23. The user equipment of claim 21, wherein the one or more RB groups comprises two or more RB groups each having a substantially equal number of RBs.

24. The user equipment of claim 21, wherein each of the one or more RB groups comprises a number of RBs, wherein the number is an integer multiple of two, three, or five.

25. The user equipment of claim 21, wherein the at least one processor and the memory are further operable to determine a size of the one or more RB groups based on at least one of a configured starting offset or a system bandwidth of the uplink resource grant.

26. The user equipment of claim 21, wherein the at least one processor and the memory are further operable to determine a size of the one or more RB groups based on a symbol type, wherein the symbol type comprises of a first type configurable for sounding reference signal (SRS) transmission, or a second type not configurable for SRS transmission.

27. The user equipment of claim 18, wherein the at least one processor and the memory are operable to receive the uplink resource grant as part of a multiple-stage resource grant, wherein a first stage grant includes at least one of a modulation and coding scheme (MCS), a transmit power control, or precoding information, and a second stage grant includes at least one of a new data indicator, a hybrid automatic repeat/request (HARM) process identity, a delta MCS, a demodulation reference signal cyclic shift, a ULL reference signal triggering indicator, an aperiodic channel state information triggering indicator, or an indication of allocated resources in the uplink resource grant, or any combination thereof.

28. The user equipment of claim 18, wherein the at least one processor and the memory are further operable to determine a transport block size (TBS) scaling factor and transmit the communications based at least in part on a TBS computed based on the TBS scaling factor.

29. The user equipment of claim 18, wherein the at least one processor and the memory are further operable to transmit, via the transceiver, other communications to the network entity over the resources specified in the second uplink resource grant during the second TTI in parallel with the communications over the resources specified in the uplink resource grant related to the first TTI.

30. The user equipment of claim 18, wherein the at least one processor and the memory are operable to prioritize the transmission of communications at least in part by dropping transmission of communications over the resources specified in the second uplink resource grant during the TTI or the second TTI.

31. The user equipment of claim 18, wherein the second uplink resource grant corresponds to one of a physical uplink control channel, a physical uplink shared channel, or a sounding reference signal in long term evolution.

32. The user equipment of claim 18, wherein the at least one processor and the memory are further operable to puncture one or more modulation symbols with a set of modulation symbols corresponding to the uplink resource grant to facilitate at least one of channel estimation or interference estimation over the TTL.

33. The user equipment of claim 32, wherein the one or more modulation symbols have one or more determined values.

34. The user equipment of claim 32, wherein the one or more modulation symbols have a modulation order lower than the modulation order corresponding to the uplink resource grant.

35. A user equipment for communicating in a wireless network, comprising:
means for receiving an uplink resource grant from a network entity for communicating in the wireless network;
means for determining a transmission time interval (TTI) for an uplink transmission within a subframe based on the uplink resource grant, wherein the TTI is a first TTI comprising one or more symbols which are a subset of a plurality of symbols in the subframe;
means for receiving a second uplink resource grant from the network entity for communicating in the wireless network;
means for determining a second TTI for a second uplink transmission based on the second uplink resource grant, wherein the second TTI comprises the subframe; and
means for transmitting communications to the network entity over resources specified in the uplink resource grant during the TTI, wherein the means for transmitting transmits the communications at least in part by prioritizing transmission of communications over the resources specified in the uplink resource grant related to the first TTI over transmission of communications over the resources specified in the second uplink resource grant.

36. The user equipment of claim 35, wherein a duration of the TTI comprises at least one of a symbol duration, a two-symbol duration, or a slot duration wherein the subframe comprises two slots.

37. The user equipment of claim 35, wherein each of the one or more symbols in the TTI is based on one of an orthogonal frequency division multiplexing (OFDM) symbol or a single-carrier frequency-division-multiplexing (SC-FDM) symbol.

38. The user equipment of claim 35, wherein the uplink resource grant allocates one or more resource block (RB) groups within at least a portion of the one or more symbols for control or data transmissions on one or more uplink channels, and wherein each of the one or more RB groups comprises a plurality of RBs.

39. The user equipment of claim 35, wherein the means for receiving the uplink resource grant receives the uplink resource grant as part of a multiple-stage resource grant, wherein a first stage grant includes at least one of a modulation and coding scheme (MCS), a transmit power control, or precoding information, and a second stage grant includes at least one of a new data indicator, a hybrid automatic repeat/request (HARQ) process identity, a delta MCS, a demodulation reference signal cyclic shift, a ULL reference signal triggering indicator, an aperiodic channel state information triggering indicator, or an indication of allocated resources in the uplink resource grant, or any combination thereof.

40. The user equipment of claim 35, further comprising means for determining a transport block size (TBS) scaling factor, wherein the means for transmitting transmits the communications based at least in part on a TBS computed based on the TBS scaling factor.

41. The user equipment of claim 35, further comprising means for puncturing one or more modulation symbols with a set of modulation symbols corresponding to the uplink resource grant to facilitate at least one of channel estimation or interference estimation over the TTI.

42. A non-transitory computer-readable storage medium comprising computer-executable code for communicating in a wireless network, the code comprising:
code for receiving an uplink resource grant from a network entity for communicating in the wireless network;
code for determining a transmission time interval (TTI) for an uplink transmission within a subframe based on the uplink resource grant, wherein the TTI is a first TTI comprising one or more symbols which are a subset of a plurality of symbols in the subframe;
code for receiving a second uplink resource grant from the network entity for communicating in the wireless network;

code for determining a second TTI for a second uplink transmission based on the second uplink resource grant, wherein the second TTI comprises the subframe; and code for transmitting communications to the network entity over resources specified in the uplink resource grant during the TTI, wherein the code for transmitting transmits the communications at least in part by prioritizing transmission of communications over the resources specified in the uplink resource grant related to the first TTI over transmission of communications over the resources specified in the second uplink resource grant.

43. The non-transitory computer-readable storage medium of claim 42, wherein a duration of the TTI comprises at least one of a symbol duration, a two-symbol duration, or a slot duration wherein the subframe comprises two slots.

44. The non-transitory computer-readable storage medium of claim 42, wherein each of the one or more symbols in the TTI is based on one of an orthogonal frequency division multiplexing (OFDM) symbol or a single-carrier frequency-division-multiplexing (SC-FDM) symbol.

45. The non-transitory computer-readable storage medium of claim 42, wherein the uplink resource grant allocates one or more resource block (RB) groups within at least a portion of the one or more symbols for control or data transmissions on one or more uplink channels, and wherein each of the one or more RB groups comprises a plurality of RBs.

46. The non-transitory computer-readable storage medium of claim 42, wherein the code for receiving the uplink resource grant receives the uplink resource grant as part of a multiple-stage resource grant, wherein a first stage grant includes at least one of a modulation and coding scheme (MCS), a transmit power control, or precoding information, and a second stage grant includes at least one of a new data indicator, a hybrid automatic repeat/request (HARQ) process identity, a delta MCS, a demodulation reference signal cyclic shift, a ULL reference signal triggering indicator, an aperiodic channel state information triggering indicator, or an indication of allocated resources in the uplink resource grant, or any combination thereof.

47. The non-transitory computer-readable storage medium of claim 42, further comprising code for determining a transport block size (TBS) scaling factor, wherein code for transmitting transmits the communications based at least in part on a TBS computed based on the TBS scaling factor.

48. The non-transitory computer-readable storage medium of claim 42, further comprising code for puncturing one or more modulation symbols with a set of modulation symbols corresponding to the uplink resource grant to facilitate at least one of channel estimation or interference estimation over the TTI.

49. The user equipment of claim 38, wherein the uplink resource grant allocates at least two RB groups, and wherein the at least two RB groups are contiguous in frequency.

50. The user equipment of claim 38, wherein the one or more RB groups comprises two or more RB groups each having a substantially equal number of RBs.

51. The user equipment of claim 38, wherein each of the one or more RB groups comprises a number of RBs, wherein the number is an integer multiple of two, three, or five.

52. The user equipment of claim 38, further comprising means for determining a size of the one or more RB groups based on at least one of a configured starting offset or a system bandwidth of the uplink resource grant.

53. The user equipment of claim 38, further comprising means for determining a size of the one or more RB groups based on a symbol type, wherein the symbol type comprises of a first type configurable for sounding reference signal (SRS) transmission, or a second type not configurable for SRS transmission.

54. The user equipment of claim 35, further comprising means for transmitting other communications to the network entity over the resources specified in the second uplink resource grant during the second TTI in parallel with the communications over the resources specified in the uplink resource grant related to the first TTI.

55. The user equipment of claim 35, wherein the means for transmitting prioritizes at least in part by dropping transmission of communications over the resources specified in the second uplink resource grant during the TTI or the second TTI.

56. The user equipment of claim 35, wherein the second uplink resource grant corresponds to one of a physical uplink control channel, a physical uplink shared channel, or a sounding reference signal in long term evolution.

57. The user equipment of claim 41, wherein the one or more modulation symbols have one or more determined values.

58. The user equipment of claim 41, wherein the one or more modulation symbols have a modulation order lower than the modulation order corresponding to the uplink resource grant.

59. The non-transitory computer-readable storage medium of claim 45, wherein the uplink resource grant allocates at least two RB groups, and wherein the at least two RB groups are contiguous in frequency.

60. The non-transitory computer-readable storage medium of claim 45, wherein the one or more RB groups comprises two or more RB groups each having a substantially equal number of RBs.

61. The non-transitory computer-readable storage medium of claim 45, wherein each of the one or more RB groups comprises a number of RBs, wherein the number is an integer multiple of two, three, or five.

62. The non-transitory computer-readable storage medium of claim 45, further comprising means for determining a size of the one or more RB groups based on at least one of a configured starting offset or a system bandwidth of the uplink resource grant.

63. The non-transitory computer-readable storage medium of claim 45, further comprising means for determining a size of the one or more RB groups based on a symbol type, wherein the symbol type comprises of a first type configurable for sounding reference signal (SRS) transmission, or a second type not configurable for SRS transmission.

64. The non-transitory computer-readable storage medium of claim 42, further comprising means for transmitting other communications to the network entity over the resources specified in the second uplink resource grant during the second TTI in parallel with the communications over the resources specified in the uplink resource grant related to the first TTI.

65. The non-transitory computer-readable storage medium of claim 42, wherein the means for transmitting prioritizes at least in part by dropping transmission of communications over the resources specified in the second uplink resource grant during the TTI or the second TTI.

66. The non-transitory computer-readable storage medium of claim 42, wherein the second uplink resource grant corresponds to one of a physical uplink control channel, a physical uplink shared channel, or a sounding reference signal in long term evolution.

67. The non-transitory computer-readable storage medium of claim 48, wherein the one or more modulation symbols have one or more determined values.

68. The non-transitory computer-readable storage medium of claim 48, wherein the one or more modulation symbols have a modulation order lower than the modulation order corresponding to the uplink resource grant.

* * * * *